(12) United States Patent
Young et al.

(10) Patent No.: US 12,129,180 B2
(45) Date of Patent: Oct. 29, 2024

(54) SYSTEMS AND METHODS FOR THE RECYCLING OF LITHIUM FROM BATTERY WASTE

(71) Applicant: Li Industries, Inc., Blacksburg, VA (US)

(72) Inventors: David Young, Sudbury, MA (US); Tairan Yang, Blacksburg, VA (US); Panni Zheng, Blacksburg, VA (US); Zheng Li, Blacksburg, VA (US)

(73) Assignee: Li Industries, Inc., Blacksburg, VA (US)

( * ) Notice: Subject to any disclaimer, the term of this patent is extended or adjusted under 35 U.S.C. 154(b) by 0 days.

(21) Appl. No.: 18/592,728

(22) Filed: Mar. 1, 2024

(65) Prior Publication Data
US 2024/0294389 A1  Sep. 5, 2024

Related U.S. Application Data

(60) Provisional application No. 63/469,950, filed on May 31, 2023, provisional application No. 63/488,378, filed on Mar. 3, 2023.

(51) Int. Cl.
*C01D 15/08* (2006.01)
*B01D 15/36* (2006.01)
(Continued)

(52) U.S. Cl.
CPC .......... *C01D 15/08* (2013.01); *B01D 15/361* (2013.01); *C01B 25/30* (2013.01); *C01D 15/04* (2013.01);
(Continued)

(58) Field of Classification Search
CPC ...... C01D 15/08; C01D 15/04; B01D 15/361; C01B 25/30; C22B 26/12; C22B 1/005; H01M 10/54
See application file for complete search history.

(56) References Cited

U.S. PATENT DOCUMENTS

| | | |
|---|---|---|
| 7,902,299 B2 | 3/2011 | Kerr et al. |
| 8,067,107 B2 | 11/2011 | Sloop et al. |

(Continued)

FOREIGN PATENT DOCUMENTS

| | | |
|---|---|---|
| CA | 3076688 A1 | 4/2019 |
| CA | 3202960 A1 | 6/2022 |

(Continued)

OTHER PUBLICATIONS

Zhu et al. "Recovery of Co and Li from spent lithium-ion batteries by combination method of acid leaching and chemical precipitation" Trans. Nonferrous Met. Soc. China 22(2012) 2274-2281 (Year: 2012).*

(Continued)

*Primary Examiner* — Anthony J Zimmer
*Assistant Examiner* — Syed T Iqbal
(74) *Attorney, Agent, or Firm* — COOLEY LLP

(57) ABSTRACT

Embodiments described herein relate to recycling of spent lithium battery material. In some aspects, a method can include suspending a lithium source in a solvent containing an oxidation reagent to extract lithium, forming an extracted lithium solution, separating the extracted lithium solution from residual solids of a lithium source, purifying the extracted lithium solution by precipitating and filtering impurities, and precipitating the lithium in the purified lithium solution to generate lithium carbonate ($Li_2CO_3$). In some embodiments, the method can further include preprocessing the lithium source to improve kinetics of the lithium extraction. In some embodiments, the preprocessing can include a cutting or shredding step to downsize the lithium source. In some embodiments, the lithium source can include lithium-ion battery waste. In some embodiments, the oxidation reagent can include sodium persulfate ($Na_2S_2O_8$), potassium persulfate ($K_2S_2O_8$), ammonium persulfate (Continued)

($NH_4$)$_2$$S_2$$O_8$, hydrogen peroxide ($H_2O_2$), ozone ($O_3$), and/or nitrous oxide ($N_2O$).

24 Claims, 6 Drawing Sheets

(51) Int. Cl.

| | | |
|---|---|---|
| *C01B 25/30* | (2006.01) | |
| *C01D 15/04* | (2006.01) | |
| *C22B 1/00* | (2006.01) | |
| *C22B 26/12* | (2006.01) | |
| *H01M 10/54* | (2006.01) | |

(52) U.S. Cl.
CPC ............. *C22B 26/12* (2013.01); *H01M 10/54* (2013.01); *C22B 1/005* (2013.01)

(56) References Cited

U.S. PATENT DOCUMENTS

| | | |
|---|---|---|
| 8,497,030 B2 | 7/2013 | Sloop |
| 8,823,329 B2 | 9/2014 | Sloop et al. |
| 8,846,225 B2 | 9/2014 | Sloop |
| 9,287,552 B2 | 3/2016 | Sloop |
| 9,484,606 B1 | 11/2016 | Sloop et al. |
| 9,825,341 B2 | 11/2017 | Sloop |
| 10,014,562 B2 | 7/2018 | Sloop |
| 10,333,183 B2 | 6/2019 | Sloop |
| 11,394,062 B2 | 7/2022 | Sloop |
| 2001/0028871 A1 | 10/2001 | Harrison et al. |
| 2010/0146761 A1 | 6/2010 | Sloop |
| 2010/0203366 A1 | 8/2010 | Sloop |
| 2011/0300041 A1* | 12/2011 | Galli ..................... C01D 15/04 423/499.3 |
| 2019/0260100 A1 | 8/2019 | Sloop |
| 2021/0079495 A1 | 3/2021 | Harris et al. |
| 2021/0143489 A1 | 5/2021 | Sloop et al. |
| 2022/0271356 A1 | 8/2022 | Sloop et al. |
| 2022/0352572 A1 | 11/2022 | Sloop |
| 2023/0038978 A1 | 2/2023 | Gratz et al. |
| 2023/0070883 A1 | 3/2023 | Sloop et al. |
| 2023/0198041 A1 | 6/2023 | Sloop et al. |
| 2023/0395889 A1 | 12/2023 | Yang et al. |
| 2023/0411725 A1 | 12/2023 | Yang et al. |

FOREIGN PATENT DOCUMENTS

| | | |
|---|---|---|
| CN | 111994926 A | 11/2020 |
| CN | 113793994 A | 12/2021 |
| KR | 101918234 B1 | 11/2018 |
| WO | WO-2009105713 A1 | 8/2009 |
| WO | WO-2010014637 A1 | 2/2010 |
| WO | WO-2010077982 A2 | 7/2010 |
| WO | WO-2011109831 A2 | 9/2011 |
| WO | WO-2016022858 A1 | 2/2016 |
| WO | WO-2017142644 A2 | 8/2017 |
| WO | WO-2020236513 A1 | 11/2020 |
| WO | WO-2021096990 A1 | 5/2021 |
| WO | WO-2023019224 A1 | 2/2023 |

OTHER PUBLICATIONS

Pindar et al. "Recycling of mixed discarded lithium-ion batteries via microwave processing route" Sustainable Materials and Technologies 25 (2020) e00157 (Year: 2020).*
Jandova et al. "Processing of zinnwaldite waste to obtain Li2CO3", Hydrometallurgy 103 (2010) 12-18 (Year: 2010).*
Chen et al. "Hydrometallurgical process for the recovery of metal values from spent lithium-ion batteries in citric acid media" Waste Management & Research 2014, vol. 32(11) 1083-1093 (Year: 2014).*
Virolainen et al. "Removal of iron, aluminium, manganese and copper from leach solutions of lithium-ion battery waste using ion exchange" Hydrometallurgy 202 (2021) 105602 (Year: 2021).*
International Search Report and Written Opinion for PCT Application No. PCT/US2024/01799 mailed Jul. 12, 2024, 18 pages.
Jung J C, et al., "A review of recycling spent lithium-ion battery cathode materials using hydrometallurgical treatments" Journal of Energy Storage, vol. 35, Jan. 27, 2021 (Jan. 27, 2021), p. 102217.
Muammer K., "State-of-the-art lithium-ion battery recycling technologies," Circular Economy, vol. 1, No. 2, Dec. 1, 2022 (Dec. 1, 2022), p. 100015.
Or et al., "Recycling of mixed cathode lithium-ion batteries for electric vehicles: Current status and future outlook," Carbon Energy, vol. 2, No. 1, Jan. 10, 2020, pp. 6-43.
Yadav P et al., "Recycling of cathode from spent lithium iron phosphate batteries" Journal of Hazardous Materials, vol. 399, Nov. 1, 2020 (Nov. 1, 2020), p. 123068.

* cited by examiner

SYSTEMS AND METHODS FOR THE RECYCLING OF LITHIUM FROM BATTERY WASTE

RELATED APPLICATIONS

This application claims priority and the benefit of U.S. Provisional Application No. 63/488,378, filed Mar. 3, 2023 and titled "Systems and Methods for the Recycling of Lithium from Battery Waste," and U.S. Provisional Application No. 63/469,950, filed May 31, 2023 and titled "Systems and Methods for the Recycling of Lithium from Battery Waste," the disclosures of which are hereby incorporated by reference in their entireties.

TECHNICAL FIELD

Embodiments described herein relate systems and methods of recycling lithium from spent battery material.

BACKGROUND

Lithium-ion batteries (LIBs) are widely implemented for portable electronic devices, electric vehicles, and grid energy storage due to their low self-discharge rate, high energy and power density, and long cycle life. The market for LIBs will continue to grow in the future. Among the cathode active materials, olivine-type lithium iron phosphate (LiFePO$_4$, also referred to as LFP), and its derivatives, have attracted much attention and have several distinct advantages over their counterparts. LFP and its derivatives, when used as cathode materials in LIBs, are intrinsically safer, cheaper, and highly durable when compared to other cathode materials. However, the LIB production process results in the formation of undesired by-products. Capture and use of these by-products can greatly improve the efficiency of the overall LIB production process.

SUMMARY

Embodiments described herein relate to recycling of spent lithium battery material. In some aspects, a method can include suspending a lithium source in a solvent containing an oxidation reagent to extract lithium, forming an extracted lithium solution, separating the extracted lithium solution from residual solids of a lithium source, purifying the extracted lithium solution by precipitating and filtering impurities, and precipitating the lithium in the purified lithium solution to generate lithium carbonate (Li$_2$CO$_3$). In some embodiments, the method can further include preprocessing the lithium source to improve kinetics of the lithium extraction. In some embodiments, the preprocessing can include a cutting or shredding step to downsize the lithium source. In some embodiments, the lithium source can include lithium-ion battery waste. In some embodiments, the oxidation reagent can include sodium persulfate (Na$_2$S$_2$O$_8$), potassium persulfate (K$_2$S$_2$O$_8$), ammonium persulfate (NH$_4$)$_2$S$_2$O$_8$, hydrogen peroxide (H$_2$O$_2$), ozone (O$_3$), and/or nitrous oxide (N$_2$O).

DETAILED DESCRIPTION

Figure 1:
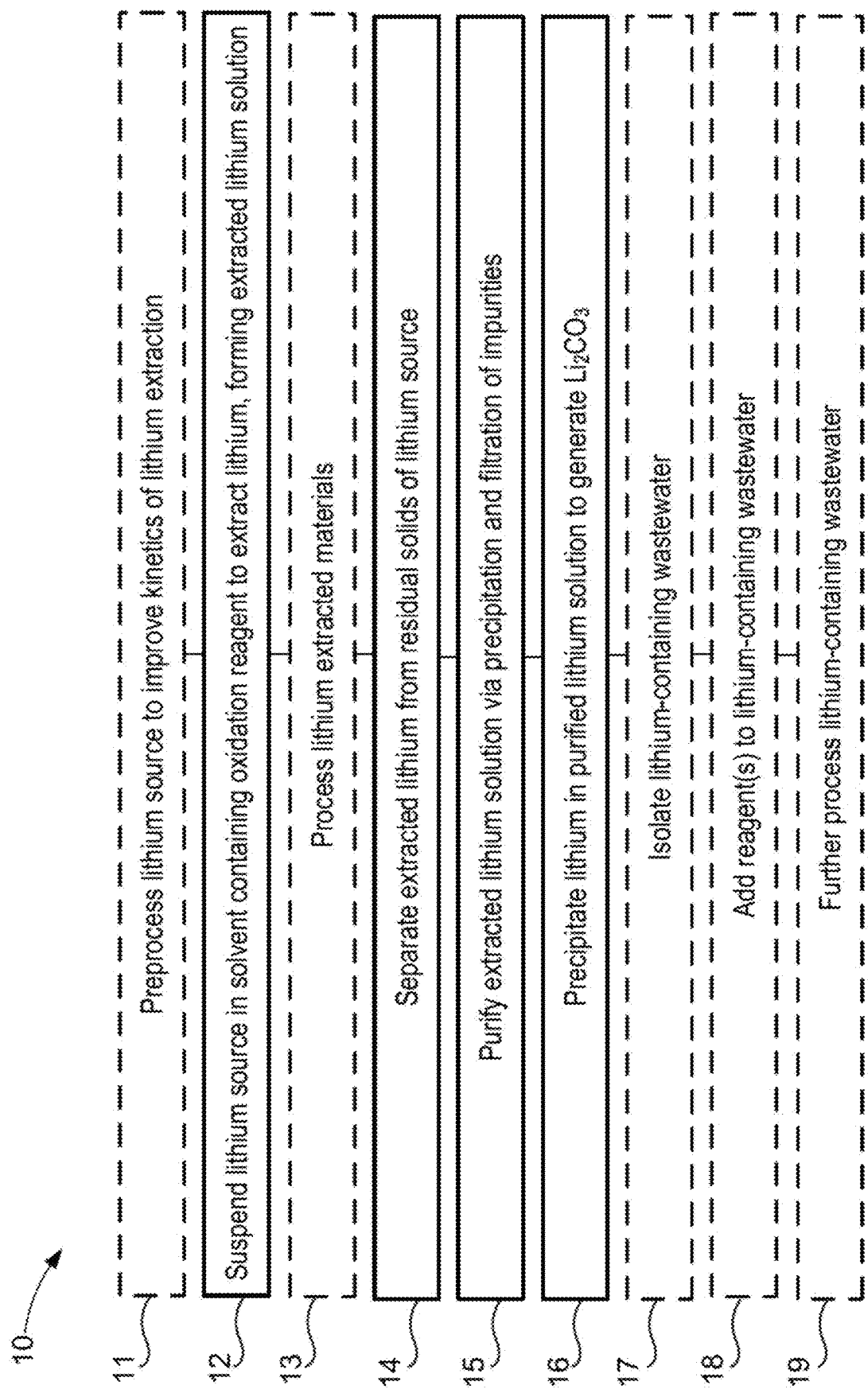
FIG. 1 is a flow diagram of a method of producing Li$_2$CO$_3$ from a lithium source, according to an embodiment.

Embodiments described herein relate to systems and methods of recycling spent batteries. Abundant sources of lithium are important for continued generation of new battery materials, including cathode compounds. The demand for lithium has increased globally in recent decades. Industries driving this increase include the battery materials industry, the ceramics industry, and the chemical additives industry. High-purity Li$_2$CO$_3$ is the most widely used lithium precursor for the production of different lithium-ion battery cathode materials. Lithium hydroxide (LiOH) is also a common lithium precursor. Extracting lithium as Li$_2$CO$_3$ or LiOH is an efficient and economic pathway for the recycling of low cost LFP, and its derivatives, which can include end-of-life, used, scrap, defect LFP batteries, constituent materials, or work-in-process materials.

Embodiments described herein can develop a high purity Li$_2$CO$_3$ product. Methods of producing a high purity Li$_2$CO$_3$ process include suspending a lithium source and extracting lithium from the suspended lithium source. Precipitation and filtration can be used to improve the purity of the captured Li$_2$CO$_3$. In some embodiments, a lithium source material can originate from an electrode (also referred to as a lithium source electrode), electrode materials, and/or scrap electrode materials. In some embodiments, the lithium source can include at least one chemical composition and/or a chemical structure including lithium. In some embodiments, the lithium source can be included in a mixture or attached to other materials that do not include lithium. In some embodiments, the lithium source can include a component in a system (e.g., a full battery cell, a half battery cell, battery production scrap, battery production work-in-process material). In some embodiments, the component can be shredded, cut, milled, or ground into powder or flakes (e.g., black mass).

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

FIG. 1 is a flow diagram of a method 10 of producing $Li_2CO_3$, according to an embodiment. Optional steps are shown with dotted boxes. As shown, the method 10 optionally includes preprocessing a lithium source to improve the kinetics of lithium extraction at step 11. The method 10 further includes suspending the lithium source in a solvent containing an oxidation reagent to extract lithium and form an extracted lithium solution at step 12. The method 10 optionally includes processing lithium-extracted materials at step 13. The method 10 further includes separating the extracted lithium from residual solids of the lithium source at step 14, purifying the extracted lithium solution via precipitation and filtration of impurities at step 15, and precipitating the lithium in the purified lithium solution to generate $Li_2CO_3$ at step 16. The method 10 optionally includes isolating lithium-containing wastewater at step 17, adding one or more reagents to the lithium-containing wastewater at step 18, and further processing the lithium-containing wastewater at step 19.

Step 11 is optional and includes pre-processing a lithium source to improve the kinetics of lithium extraction. In some embodiments, the preprocessing can include mechanical, chemical, and/or thermal treatment of the lithium source. The preprocessing step can enable or improve oxidation extraction of the lithium source. Higher reaction kinetics lead to a higher oxidation reaction rate and therefore a faster lithium production rate. In some embodiments, the preprocessing can alter the properties of the lithium source to enhance facile lithium extraction. In some embodiments, the pre-processing of the lithium source can include shredding, crushing, and/or pulverizing the lithium source. In some embodiments, the lithium source materials (e.g., batteries) go through a cutting/shredding step to expose the internal cathode materials for the oxidation and extraction at step 12. In some embodiments, the lithium source materials can be downsized into flakes or pieces via methods such as shredding, cutting, milling, or crushing. In some embodiments, the lithium source materials can go through a comminution process to be downsized to the microscale/nanoscale. In some embodiments, the comminution process can include tamp milling, tooth milling, knife milling, ball milling, jet milling, mortar milling, and crushing.

In some embodiments, the preprocessing can improve the wetting of the lithium source materials before the oxidation extraction at step 12. In some embodiments, the lithium source materials can be vacuum-filled to enhance the wetting. In some embodiments, the lithium source materials can be ultrasonicated in water before and/or during the oxidation extraction at step 12. In some embodiments, the lithium source materials can be heated to a temperature of no more than about 100° C., no more than about 90° C., no more than about 80° C., no more than about 70° C., no more than about 60° C., no more than about 50° C., no more than about 40° C. in water before and/or during the oxidation extraction at step 12. In some embodiments, the lithium source materials can be heated to a temperature of no more than about 800° C., no more than about 700° C., no more than about 600° C., no more than about 500° C., no more than about 400° C., no more than about 300° C., no more than about 200° C., or no more than about 100° C. in air or another gas mixture (e.g., $N_2$, Ar) during the preprocessing at step 11. This heating can serve to remove certain components from the lithium source, such as binder or organics, that can allow for a more facile oxidation process at step 12.

Step 12 includes suspending a lithium source in a solvent containing an oxidation reagent to extract lithium, thereby forming an extracted lithium solution. In some embodiments, the lithium source can include a lithium source electrode (i.e., an electrode containing lithium). In some embodiments, the lithium source can originate from a spent battery. In some embodiments, the lithium source electrode can include $LiFePO_4$. In some embodiments, the lithium source electrode can include $Li_xM_yPO_4$, where M is at least one transition metal and x and y are integers. In some embodiments, the lithium source electrode can include the doped derivative of lithium iron phosphate (e.g., $LiM_xFe_{1-x}PO_4$, or $Li_{1-x}M_xPO_4$, wherein M can one or more transition metals and x and y are integers). In some embodiments, the lithium source electrode can include lithium cobalt oxide (LCO), lithium nickel cobalt manganese oxide (NCM or NMC), lithium nickel cobalt aluminum oxide (NCA), and/or lithium manganese oxide (LMO). In some embodiments, the lithium source electrode can include a complex containing any of the aforementioned materials. In some embodiments, the lithium source electrode can be coated with any of the aforementioned materials.

In some embodiments, the lithium source can include defect, scrap, or end-of-life lithium-ion batteries. In some embodiments, the lithium source can include used or end-of-life electrode sheets. In some embodiments, the lithium source can include electrode scrap materials. In some embodiments, the lithium source can include used, defect, scrap, or end-of-life lithium-ion batteries. In some embodiments, the electrode scrap materials can include cathode, anode, and/or battery work-in-process slurries. In some embodiments, the electrode scrap materials can include other battery components or work-in-process materials, or a mixture thereof. In some embodiments, the lithium source can include crushed and/or shredded end-of-life battery materials. In some embodiments, the lithium source can include a mixture of the aforementioned electrode forms.

Step 12 includes oxidation and extraction of the lithium source. This can include oxidizing (via an oxidation agent) the transition metals in the lithium source via one or more oxidation reagents. The lithium is then extracted from the suspension as an extracted lithium solution. The extracted lithium solution can be separated from the residual solids of the lithium source. In some embodiments, the oxidation agent can include $Na_2S_2O_8$. $Na_2S_2O_8$ has a standard redox potential of 1.96 V. The high oxidation voltage of $Na_2S_2O_8$ can result in less extraction time compared to other oxidizers. In some embodiments, the oxidation agent can include $K_2S_2O_8$, $(NH_4)_2S_2O_8$, or any combination thereof. In some embodiments, the oxidation agent can include $H_2O_2$. Hydrogen peroxide has a standard redox potential of 1.763 V. The use of $H_2O_2$ can significantly decrease the sodium/potassium concentration solution, which can introduce less sodium impurity to the produced lithium carbonate. Due to the reduced concentration of sodium salts when $H_2O_2$ is used as the oxidizer, the lithium can also be precipitated (i.e., in step 16 described below) with a smaller final volume (as less liquid is needed to prevent sodium compound precipitation). Thus, the $Li_2CO_3$ yield can be increased by reducing the amount of $Li_2CO_3$ dissolved in a solution with a smaller volume. In some embodiments, the oxidation agent can include $O_3$. Ozone ($O_3$) has a standard redox potential of 2.07 V. In some embodiments, the oxidation agent can include $N_2O$ gas. $N_2O$ gas has a standard redox potential of 1.77 V. In some embodiments, the oxidation agent used in the extraction step can include chlorine gas, which has a standard redox potential of 1.396 V. In some embodiments, the oxidation agent used in the extraction step can include any combination of the aforementioned oxidation agents. In some embodiments, multiple oxidation agents can be used in succession, or at least partially concurrently.

In some embodiments, the amount of oxidation agent used during the oxidation can be at least about 0.25, at least about 0.5, at least about 0.6, at least about 0.7, at least about 0.8, at least about 0.9, at least about 1, at least about 1.1, at least about 1.25, at least about 1.5, at least about 1.75, at least about 2, at least about 2.25, at least about 2.5, at least about 2.75, at least about 3, at least about 4, at least about 5, at least about 6, at least about 7, at least about 8, or at least about 9 times the stoichiometric amount needed to extract all lithium from the lithium source. In some embodiments, the amount of oxidation agent used during the oxidation can be no more than about 10, no more than about 9, no more than about 8, no more than about 7, no more than about 6, no more than about 5, no more than about 4, no more than about 3, no more than about 2.75, no more than about 2.5, no more than about 2.25, no more than about 2, no more than about 1.75, no more than about 1.5, no more than about 1.25, no more than about 1.1, no more than about 1, no more than about 0.9, no more than about 0.8, no more than about 0.7, no more than about 0.6, or no more than about 0.5 times the stoichiometric amount needed to extract all lithium from the lithium source. Combinations of the above-referenced stoichiometric ratios are also possible (e.g., at least about 0.25 and no more than about 10 or at least about 1 and no more than about 5), inclusive of all values and ranges therebetween. In some embodiments, the amount of oxidation agent used during the oxidation can be about 0.25, about 0.5, about 0.6, about 0.7, about 0.8, about 0.9, about 1, about 1.1, about 1.25, about 1.5, about 1.75, about 2, about 2.25, about 2.5, about 2.75, about 3, about 4, about 5, about 6, about 7, about 8, about 9, or about 10 times the stoichiometric amount needed to extract all lithium from the lithium source.

In some embodiments, the oxidation agent can oxidize water and generate oxygen gas and fee protons in the extracted lithium solution, thereby creating an acidic environment. For example, the use of $Na_2S_2O_8$ (or alternatively $K_2S_2O_8$ or $(NH_4)_2S_2O_8$) as the oxidizer generates $H_2SO_4$. The transition metals in the lithium source can gradually dissolve into the lithium solution under an acidic environment. A high concentration of these impurity ions leads to more precipitates during the purification at step 15 (description below), and results in a slower extraction speed (e.g., the filtration process, if used in step, is slower). Additionally, the dissolution of transition metals into the lithium solution can degrade the structure of the lithium-extracted electrode materials and can have a negative effect on their recyclability (e.g., recycling of $FePO_4$ for extraction from LFP source materials). In some embodiments, a mixture of $Na_2S_2O_8$ (or alternatively $K_2S_2O_8$ or $(NH_4)_2S_2O_8$) and $H_2O_2$ is used for the oxidation extraction. The ratio of $Na_2S_2O_8$ and $H_2O_2$ can be adjusted to serve different extraction preferences.

In some embodiments, the wt:wt ratio of $Na_2S_2O_8$ to $H_2O_2$ can be at least about 1:10, at least about 1:9, at least about 1:8, at least about 1:7, at least about 1:6, at least about 1:5, at least about 1:4, at least about 1:3, at least about 1:2, at least about 1:1, at least about 2:1, at least about 3:1, at least about 4:1, at least about 5:1, at least about 6:1, at least about 7:1, at least about 8:1, or at least about 9:1. In some embodiments, the wt:wt ratio of $Na_2S_2O_8$ to $H_2O_2$ can be no more than about 10:1, no more than about 9:1, no more than about 8:1, no more than about 7:1, no more than about 6:1, no more than about 5:1, no more than about 4:1, no more than about 3:1, no more than about 2:1, no more than about 1:1, no more than about 1:2, no more than about 1:3, no more than about 1:4, no more than about 1:5, no more than about 1:6, no more than about 1:7, no more than about 1:8, or no more than about 1:9. Combinations of the above-referenced weight ratios are also possible (e.g., at least about 1:10 and no more than about 10:1 or at least about 1:3 and no more than about 3:1), inclusive of all values and ranges therebetween. In some embodiments, the wt:wt ratio of $Na_2S_2O_8$ to $H_2O_2$ can be about 1:10, about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1, about 9:1, or about 10:1.

With a higher proportion of $Na_2S_2O_8$ to $H_2O_2$, the extraction speed can be faster, and the dissolution of transition metals decreases, due to the decreased pH. In some embodiments, the pH of the extracted lithium solution can be controlled during the oxidation extraction process to decrease the dissolution of transition medals. In some embodiments, the pH of the extracted lithium solution can be monitored intermittently or constantly during the oxidation extraction. In some embodiments, alkaline and/or acidic reagents can be added to the extracted lithium solution to keep the pH of the extracted solution neutral. In some embodiments, the pH of the extracted lithium solution can be controlled between about 2 and about 3, between about 3 and about 4, between about 4 and about 5, between about 5 and about 6, between about 6 and about 7, between about 7 and about 8, or between about 8 and about 9, inclusive of all values and ranges therebetween.

In some embodiments, acetic acid can be used to control the pH of the extracted lithium solution between about 3.8 and about 5.8. In some embodiments, a mixture of two or more substances from citric acid, monopotassium phosphate, dipotassium phosphate, boric acid, acetic acid, monosodium phosphate, and disodium phosphate, can be used as the pH buffer to control the pH of the extracted lithium solution over a wide range of about 3 to about 9 or even broader. In some embodiments, monopotassium phosphate ($KH_2PO_4$) and/or monosodium phosphate ($NaH_2PO_4$) can be used to control the pH of the extracted lithium solution between about 6.2 and about 8.2. In some embodiments, 25 parts of 0.2 mol/L $K_2HPO_4$ mixed with 23.6 parts of 0.1 mol/L of sodium hydroxide and diluted to 100 parts with water can be used to control the pH at about 6.8. The kinetics of the oxidation reaction for some LFP derivatives can be slower than LFP. In some embodiments, the LFP derivatives can include Mn, Ni, and Co substitutions.

After the oxidation extraction is completed at step 12 is completed, lithium-extracted materials that have had lithium removed are generated. Step 13 is optional and includes further processing the lithium-extracted materials. In some embodiments, the lithium-extracted materials can be lithium deficient, or delithiated compounds, such as $Li_{1-x}FePO_4$ (for $0<x\leq 1$) or similar compounds that correspond to the lithium source materials. In some embodiments, the lithium-extracted materials can be directly recycled as precursors for the production of virgin cathode materials. In some embodiments, the lithium-extracted materials can be washed with water at least once, at least twice, at least three times, or at least four times to remove any soluble lithium and sodium salt impurities from the oxidation extraction at step 12. In some embodiments, battery-grade $FePO_4$ precursor can be recovered from the lithium-extracted materials at step 13. In some embodiments, this precursor can be generated by separating the $FePO_4$ from other lithium-extracted materials or impurities and heating the $FePO_4$ to remove other unwanted impurities, such as binder, carbon, or other organic compounds. In some embodiments, the lithium-extracted materials, such as $FePO_4$ or $Li_{1-x}FePO_4$ can be heated to a temperature of no more than about 1,000° C., no more than about 900° C., no more than about 800° C., no more than about 700° C., no more than about 600° C., no more than about 500° C., no more than about 400° C., no more than about 300° C., no more than about 200° C., or no more than about 100° C., in air or any other gaseous environment or mixture (e.g., $N_2$, Ar), inclusive of all values and ranges therebetween.

In some embodiments, the lithium extracted materials can be merged with new lithium source materials (including materials that have undergone preprocessing at step 11) and undergone the oxidation extraction at step 12 to further extract any residual lithium in the source materials. In some embodiments, the oxidation extraction at step 12 can be performed a third time or additional times to increase the extraction efficiency of the method 10. In some embodiments, the lithium extracted materials, after the oxidation extraction at step 12, can be rinsed and washed with water or other solvents to collect residual lithium (which can include a lithium solution or lithium-containing compounds) left in the porous structure of the lithium-extracted electrode materials. In some embodiments, the residual lithium left in the porous structure of the lithium-extracted electrode materials can be collected by centrifugal dryers.

At step 14 the lithium extracted during step 12 is separated from residual solids or impurities of the lithium source. Step 15 includes precipitating and filtering these impurities, forming a purified lithium solution. Step 14 can increase the lithium purity of the extracted lithium solution formed at step 12. Residual solids that can be removed during step 14 can include, but are not limited to Fe, Mn, Ni, Co, Mg, Ca, P, Al, and Cu. In some embodiments, these impurities can precipitate as a solid at a specific pH range and then be removed from the extracted lithium solution. In some embodiments, Fe impurities can be removed when the pH of the extracted lithium solution is adjusted to a low Fe solubility pH (e.g., a pH of about 8). In some embodiments, oxidizing reagents (e.g., hydrogen peroxide, oxygen, nitric acid, and sodium/potassium/ammonium persulfate) can be added to the extracted lithium solution to oxidize any Fe2+ to Fe3+ to better precipitate Fe in the extracted lithium solution. In some embodiments, Cu impurities are removed when the pH of the extracted lithium solution is adjusted to a low Cu solubility pH (e.g., a pH of about 9). In some embodiments, Co impurities are removed when the pH of the extracted lithium solution is adjusted to a low Co solubility pH (e.g., a pH of about or between 10 and 12). In some embodiments, Ni impurities are removed when the pH of the extracted lithium solution is adjusted to a low Ni solubility pH (e.g., a pH of about or above 10). In some embodiments, Zn impurities are removed when the pH of the extracted lithium solution is adjusted to a low Zn solubility pH (e.g., a pH of about 10). In some embodiments, Al impurities are removed when the pH of the extracted lithium solution is adjusted to a low Al solubility pH (e.g., a pH of about 6.5). In some embodiments, the aforementioned techniques to separate and remove the precipitation from the extracted lithium solution include, but are not limited to filtration, centrifugation, sedimentation, or decanting, or any combination thereof.

The solubility of some impurities in the extracted lithium solution can increase with increasing temperature. In some embodiments, the purification at step 15 can include increasing the temperature of the environment where the purification takes place. The solubility of some impurities can decrease with increasing temperature. In some embodiments, the purification at step 15 can include increasing the temperature of the environment where the purification takes place. In some embodiments, more than one impurity can be removed via pH adjustment. In some embodiments, Fe, Cu, Co, Mg, Mn, Ni, and/or Zn can precipitated and removed at a pH of about 9 to about 10, about 10 to about 11, about 11 to about 12, about 12 to about 13, or about 13 to about 14, inclusive of all values and ranges therebetween. In some embodiments, Fe, Cu, Co, Mg, Mn, Ni, and/or Zn can precipitated and removed at a pH of at least about 9, at least about 10, at least about 11, at least about 12, or at least about 13. In some embodiments, Fe, Cu, Co, Mg, Mn, Ni, and/or Zn can precipitated and removed at a pH of no more than about 14, no more than about 13, no more than about 12, no more than about 11, or no more than about 10. Combinations of the above-referenced pH values are also possible (e.g., at least about 9 and no more than about 13 or at least about 10 and no more than about 12), inclusive of all values and ranges therebetween. In some embodiments, Fe, Cu, Co, Mg, Mn, Ni, and/or Zn can precipitated and removed at a pH of about 9, about 10, about 11, about 12, or about 13.

In some embodiments, the purification of the extracted lithium solution at step 15 can include adding a salt to the extracted lithium solution. In some embodiments, the salt can include $Na_2CO_3$, $K_2CO_3$, sodium oxalate, potassium oxalate, oxalic acid, or a combination thereof. In some embodiments, the purification of the extracted lithium solution at step 15 can include multiple adjustments of the pH of the extracted lithium solution. In some embodiments, the purification of the extracted lithium solution at step 15 can include a first pH adjustment and a second pH adjustment.

In some embodiments, the first pH adjustment can be to a pH of at least about 5, at least about 5.5, at least about 6, at least about 6.5, at least about 7, at least about 7.5, at least about 8, or at least about 8.5. In some embodiments, the first pH adjustment can be to a pH of no more than about 9, no more than about 8.5, no more than about 8, no more than about 7.5, no more than about 7, no more than about 6.5, no more than about 5, or no more than about 5. Combinations of the above-referenced pH values are also possible (e.g., at least about 5 and no more than about 9 or at least about 6 and no more than about 8), inclusive of all values and ranges therebetween. In some embodiments, the first pH adjustment can be to a pH of about 5, about 5.5, about 6, about 6.5, about 7, about 7.5, about 8, about 8.5, or about 9.

In some embodiments, the second pH adjustment can be to a pH of at least about 8, at least about 8.5, at least about 9, at least about 9.5, at least about 10, or at least about 10.5. In some embodiments, the second pH adjustment can be to a pH of no more than about 11, no more than about 10.5, no more than about 10, no more than about 9.5, no more than about 9, or no more than about 8.5. Combinations of the above-referenced pH values are also possible (e.g., at least about 8 and no more than about 11 or at least about 8.5 and no more than about 10.5), inclusive of all values and ranges therebetween. In some embodiments, the second pH adjustment can be to a pH of about 8, about 8.5, about 9, about 9.5, about 10, about 10.5, or about 11.

In some embodiments, step 15 can include filtering the extracted lithium solution to remove precipitated impurities. In some embodiments, step 15 can include evaporating at least a portion of water present in the extracted lithium solution.

In some embodiments, the extracted lithium solution can be heated to a temperature of at least about 40° C., at least about 50° C., at least about 60° C., at least about 70° C., at least about 80° C., or at least about 90° C. for the precipitation of Fe, Cu, Co, Mg, Mn, Ni, and/or Zn. In some embodiments, the extracted lithium solution can be heated to a temperature of no more than about 100° C., no more than about 90° C., no more than about 80° C., no more than about 70° C., no more than about 60° C., no more than about 50° C., no more than about 40° C., or no more than about 30° C. Combinations of the above-referenced temperatures are also possible (e.g., at least about 40° C. and no more than about 100° C. or at least about 50° C. and no more than about 80° C., inclusive of all values and ranges therebetween. In some embodiments, the extracted lithium solution can be heated to a temperature of about 40° C., about 50° C., about 60° C., about 70° C., about 80° C., about 90° C., or about 100° C. for the precipitation of Fe, Cu, Co, Mg, Mn, Ni, and/or Zn. In some embodiments, the pH of the extracted lithium solution can be adjusted via CaO, Ca(OH)$_2$, NaOH, KOH, HNO$_3$, HCl, H$_2$SO$_4$, or any combination thereof.

In some embodiments, phosphorus impurities can be removed from the extracted lithium solution by adding Ca salts to the solution. In some embodiments, phosphorus can precipitate as calcium phosphate (e.g., Ca$_3$(PO$_4$)$_2$), which is largely insoluble in water. The phosphorus can then be removed from the extracted lithium solution via filtration or other similar solids removal methods described herein. In some embodiments, CaCl$_2$ and/or CaSO$_4$ can be added to the extracted lithium solution added to precipitate phosphate (PO$_4^{3-}$). In some embodiments, the extracted lithium solution can be heated to a temperature of at least about 70° C., at least about 75° C., at least about 80° C., at least about 85° C., at least about 90° C., or at least about 95° C. when the phosphate is precipitated. In some embodiments, the extracted lithium solution can be heated to a temperature of no more than about 100° C., no more than about 95° C., no more than about 90° C., no more than about 85° C., no more than about 80° C., or no more than about 75° C. when the phosphate is precipitated. Combinations of the above-referenced temperatures are also possible (e.g., at least about 70° C. and no more than about 100° C. or at least about 75° C. and no more than about 95° C.), inclusive of all values and ranges therebetween. In some embodiments, the extracted lithium solution can be heated to a temperature of about 70° C., about 75° C., about 80° C., about 85° C., about 90° C., about 95° C., or about 100° C. when the phosphate is precipitated.

In some embodiments, the Ca salts can be added during step 12. The phosphorus extracted during step 12 forms phosphate precipitates with the Ca salts. In embodiments, the phosphate precipitates are separated and removed via filtration, centrifugation, sedimentation and decanting, or a combination thereof.

In some embodiments, the phosphate precipitation can occur over a time period of at least about 1 hour, at least about 2 hours, at least about 3 hours, at least about 4 hours, at least about 5 hours, at least about 6 hours, at least about 7 hours, at least about 8 hours, at least about 9 hours, or at least about 10 hours. In some embodiments, the phosphate precipitation can be conducted at a pH of about 8, about 9, about 10, about 11, about 12, about 13, or about 14, inclusive of all values and ranges therebetween. In some embodiments, the phosphate precipitation can be removed from the extracted lithium solution via filtration, centrifugation, or sedimentation and decanting, or a combination thereof. In some embodiments, CaCO$_3$ can be added as a pH buffer during step 12. The dissolved calcium ions in the extracted lithium solution can precipitate the phosphate when the aforementioned pH, temperature, and/or time is reached.

In some embodiments, calcium can be removed from the extracted lithium solution by adding carbonate to the extracted lithium solution. In some embodiments, Na$_2$CO$_3$ and/or K$_2$CO$_3$ can be added to the extracted lithium solution to precipitate the calcium. In some embodiments, the amount of carbonate added is at least about 1.1, at least about 1.2, at least about 1.3, at least about 1.4, at least about 1.5, at least about 1.6, at least about 1.7, at least about 1.8, at least about 1.9, at least about 2.0, at least about 2.1, at least about 2.2, at least about 2.3, at least about 2.4, at least about 2.5, at least about 2.6, at least about 2.7, at least about 2.8, at least about 2.9, or at least about 3.0 times of the stoichiometric amount of calcium to ensure the efficient and/or effective removal of the calcium ions. In some embodiments, the excess carbonate does not react to form lithium carbonate that is beyond the solubility of the extracted lithium solution. In some embodiments, calcium can be removed by adding a hydroxide to the extracted lithium solution. Calcium precipitates as calcium hydroxide and can then be removed from the extracted lithium solution. In some embodiments, NaOH and/or KOH can be added to the extracted lithium solution to precipitate the calcium. In some embodiments, the pH of the extracted lithium solution can be maintained at a level of at least about 9, at least about 10, at least about 11, at least about 12, at least about 13, or at least about 14 to efficiently remove the calcium ions.

In some embodiments, calcium can be removed from the extracted lithium solution by adding an oxalate source to the extracted lithium solution. In some embodiments, the oxalate source can include sodium oxalate, potassium oxalate, oxalic acid, or a combination thereof. In some embodiments, the amount of oxalate added is at least about 1.1, at least about 1.2, at least about 1.3, at least about 1.4, at least about 1.5, at least about 1.6, at least about 1.7, at least about 1.8, at least about 1.9, at least about 2.0, at least about 2.1, at least about 2.2, at least about 2.3, at least about 2.4, at least about 2.5, at least about 2.6, at least about 2.7, at least about 2.8, at least about 2.9, or at least about 3.0 times of the stoichiometric amount of calcium to ensure the efficient and/or effective removal of the calcium ions. In some embodiments, the pH of the extracted lithium solution can be maintained at a level of at least about 9, at least about 10, at least about 11, at least about 12, at least about 13, or at least about 14 to efficiently remove the calcium ions.

In some embodiments, calcium and/or magnesium ions in the extracted lithium solution are removed by running the extracted lithium solution through ion exchange resins. In some embodiments, the ion exchange resins have iminodiacetic functional groups. In some embodiments, the ion exchange resins have aminophosphonic functional groups. In some embodiments, the ion exchange resins have phosphonic and/or sulphonic acid functional groups. In some embodiments, the ion exchange resins have amino methyl phosphonic acid functional groups. In some embodiments, more than one stage of ion exchange is performed.

In some embodiments, the extracted lithium solution can be partially evaporated to decrease the volume of the extracted lithium solution. In some embodiments, the evaporation is conducted before the Ca removal step. In some embodiments, the evaporation is conducted at the end of step 15 and before step 16. Less solution volume results in less dissolved $Li_2CO_3$ and increases the yield for the $Li_2CO_3$. In some embodiments, the volume of the purified lithium solution can be tuned, modified, or otherwise monitored to ensure it is large enough to dissolve all lithium salts at the precipitation temperature. In some embodiments, sodium and/or potassium salts can precipitate out at the end of evaporation. In some embodiments, the precipitated sodium and/or potassium salts are removed via filtration, centrifugation, or sedimentation and decanting, or a combination thereof.

In some embodiments, the lithium extracted solution can be heated to a temperature of at least about 60° C., at least about 65° C., at least about 70° C., at least about 75° C., at least about 80° C., at least about 85° C., at least about 90° C., or at least about 95° C. for the calcium precipitation. In some embodiments, the lithium extracted solution can be heated to a temperature of no more than about 100° C., no more than about 95° C., no more than about 90° C., no more than about 85° C., no more than about 80° C., no more than about 75° C., no more than about 70° C., or no more than about 65° C. for the calcium precipitation. Combinations of the above-referenced temperature ranges are also possible (e.g., at least about 60° C. and no more than about 100° C. or at least about 70° C. and no more than about 90° C.), inclusive of all values and ranges therebetween. In some embodiments, the lithium extracted solution can be heated to a temperature of about 60° C., about 65° C., about 70° C., about 75° C., about 80° C., about 85° C., about 90° C., about 95° C., or about 100° C. for the calcium precipitation.

In some embodiments, calcium precipitation can occur over a time period of at least about 1 hour, at least about 2 hours, at least about 3 hours, at least about 4 hours, at least about 5 hours, at least about 6 hours, at least about 7 hours, at least about 8 hours, at least about 9 hours, or at least about 10 hours, inclusive of all values and ranges therebetween. In some embodiments, the lithium extracted solution can be maintained at a pH of about 7, about 8, about 9, about 10, about 11, about 12, about 13, or about 14, inclusive of all values and ranges therebetween.

At step 16, lithium is precipitated from the purified lithium solution to generate a lithium-containing compound. In some embodiments, the lithium-containing compound can include $Li_2CO_3$. The precipitated lithium-containing compound, (for example in the form of precipitated $Li_2CO_3$), is then separated and removed from the purified lithium solution. In some embodiments, $Na_2CO_3$ and/or $K_2CO_3$ can be added to the purified lithium solution to precipitate the lithium-containing compound. In some embodiments, the purified lithium solution with the $Na_2CO_3$ and/or $K_2CO_3$ solution can be filtered to remove any insoluble impurities before adding the $Na_2CO_3$ and/or $K_2CO_3$ solution to the purified lithium solution. As the temperature of the purified lithium solution increases, the solubility of Na and/or K salts increases while the solubility of $Li_2CO_3$ decreases.

In some embodiments, the precipitation of lithium carbonate is conducted at a temperature of at least about 70° C., at least about 75° C., at least about 80° C., at least about 85° C., at least about 90° C., or at least about 95° C. In some embodiments, the precipitation of lithium carbonate is conducted at a temperature of no more than about 95° C., no more than about 90° C., no more than about 85° C., no more than about 80° C., or no more than about 75° C. Combinations of the above-referenced temperature ranges are also possible (e.g., at least about 70° C. and no more than about 100° C. or at least about 75° C. and no more than about 90° C.), inclusive of all values and ranges therebetween. In some embodiments, the precipitation of lithium carbonate is conducted at a temperature of about 70° C., about 75° C., about 80° C., about 85° C., about 90° C., about 95° C., or about 100° C.

In some embodiments, the purified lithium solution can be partially evaporated to decrease the volume of the purified lithium solution before or during the precipitation of the lithium-containing compound. Less solution volume results in less dissolved $Li_2CO_3$ and increases the yield for the $Li_2CO_3$. In some embodiments, the volume of the purified lithium solution can be tuned, modified, or otherwise monitored to ensure it is large enough to dissolve all Na and/or K salts at the precipitation temperature, as evaporation of too much purified lithium solution can precipitate the Na and/or K salts together with the lithium carbonate. In some embodiments, carbon dioxide ($CO_2$) gas can be pumped into a purified lithium solution to precipitate the dissolved lithium-containing compound. $CO_2$ can react with hydroxides in the purified lithium solution to form carbonates, and then $Li_2CO_3$ is formed, which can then precipitate from the purified lithium solution. In some embodiments, the $Li_2CO_3$ precipitate can be separated and collected via filtration, centrifugation, sedimentation, decanting, or a combination thereof.

In some embodiments, the particle size of the precipitated lithium carbonate is controlled by tuning the conditions during the precipitating step. In some embodiments, the conditions include the precipitation temperature, the stirring speed of the solution, the way of either adding lithium solution to $Na_2CO_3$ and/or $K_2CO_3$ solution or adding $Na_2CO_3$ and/or $K_2CO_3$ solution to lithium solution, solution mixing speed. In some embodiments, a higher stirring speed precipitates smaller lithium carbonate particles. Sodium and/or potassium impurities can be encapsulated by the lithium carbonate particles. A smaller lithium carbonate particle would decrease the Na and/or K impurities. In some embodiments, the $Na_2CO_3$ and/or $K_2CO_3$ solution goes through purification steps to remove impurities. In some embodiments, the impurities include Ca and/or Mg. In some embodiments, the purification steps include the addition of oxalate and/or running the purified lithium solution through an ion-exchange resin.

In some embodiments, the purity of the lithium-containing compound precipitated from the purified lithium solution can be increased via further processing. In some embodiments, Na and/or K are the main impurities in the collected lithium-containing compound (e.g., $Li_2CO_3$). In some embodiments, the lithium-containing compound can be washed with water or any other suitable solvent to dissolve any residual Na and/or K salts in the lithium-containing compound. In some embodiments, the lithium-containing compound can undergo a wash process via water or any other suitable solvent.

In some embodiments, the water wash process can be carried out at an elevated temperature of at least about 70° C., at least about 75° C., at least about 80° C., at least about 85° C., at least about 90° C., or at least about 95° C. In some embodiments, the water wash process can be carried out at an elevated temperature of no more than about 95° C., no more than about 90° C., no more than about 85° C., no more than about 80° C., or no more than about 75° C. Combinations of the above-referenced temperature ranges are also possible (e.g., at least about 70° C. and no more than about 100° C. or at least about 75° C. and no more than about 90° C.), inclusive of all values and ranges therebetween. In some embodiments, the water wash process can be carried out at an elevated temperature of about 70° C., about 75° C., about 80° C., about 85° C., about 90° C., about 95° C., or about 100° C. In some embodiments, the washed lithium-containing compound can be separated and collected via filtration, centrifugation, or sedimentation and decanting, or any combination thereof. In some embodiments, the wash process can be repeated multiple times to decrease the Na and K concentration in the lithium-containing compound.

In some embodiments, the lithium carbonate can be subject to size reduction before the water wash processes or between the water wash processes. In some embodiments, the size reduction is performed via milling, crushing, shredding, or a combination thereof.

Step 17 is optional and includes isolating the lithium-containing wastewater. The lithium containing wastewater can be further processed via a wastewater recycling subsystem, described in greater detail with respect to FIG. 3. The wastewater recycling subsystem can be used to further extract lithium from the wastewater from the precipitation and the wastewater from the purification at step 16. Wastewater isolation and processing can increase the overall lithium extraction yield of the method 10 and reduce waste.

Step 18 is optional and includes adding one or more reagents to the lithium-containing wastewater. In some embodiments, the reagent can include a phosphate. In some embodiments, the reagent can include $Na_3PO_4$. In some embodiments, the reagent can include $K_3PO_4$. The addition of regent can include further precipitates, such as $Li_3PO_4$.

Step 19 is optional and includes further processing of the lithium-containing wastewater. In some embodiments, the further processing can include filtration to capture precipitates. In some embodiments, step 19 can include isolating and further processing the precipitates. In some embodiments, the precipitates can include $Li_3PO_4$.

In some embodiments, the method 10 can produce $Li_2CO_3$ with a purity of at least about 70 wt %, at least about 75 wt %, at least about 80 wt %, at least about 85 wt %, at least about 90 wt %, at least about 95 wt %, at least about 96 wt %, at least about 97 wt %, at least about 98 wt %, at least about 99 wt %, at least about 99.5 wt %, at least about 99.9 wt %, or at least about 99.99 wt %, inclusive of all values and ranges therebetween. In some embodiments, the method 10 can produce battery-grade $Li_2CO_3$.

In some embodiments, the produced $Li_2CO_3$ can include less than about 1 wt % impurities. In some embodiments, the produced $Li_2CO_3$ can include less than about 1 wt % sodium. In some embodiments, the produced $Li_2CO_3$ can include less than about 0.9 wt %, less than about 0.8 wt %, less than about 0.7 wt %, less than about 0.6 wt %, less than about 0.5 wt %, less than about 0.4 wt %, less than about 0.3 wt %, less than about 0.2 wt %, less than about 0.1 wt %, less than about 0.09 wt %, less than about 0.08 wt %, less than about 0.07 wt %, less than about 0.06 wt %, less than about 0.05 wt %, less than about 0.04 wt %, less than about 0.03 wt %, less than about 0.02 wt %, or less than about 0.01 wt % sodium, inclusive of all values and ranges therebetween.

In some embodiments, the produced $Li_2CO_3$ can include less than about 1 wt %, less than about 0.9 wt % calcium. In some embodiments, the produced $Li_2CO_3$ can include less than about 0.8 wt %, less than about 0.7 wt %, less than about 0.6 wt %, less than about 0.5 wt %, less than about 0.4 wt %, less than about 0.3 wt %, less than about 0.2 wt %, less than about 0.1 wt %, less than about 0.09 wt %, less than about 0.08 wt %, less than about 0.07 wt %, less than about 0.06 wt %, less than about 0.05 wt %, less than about 0.04 wt %, less than about 0.03 wt %, less than about 0.02 wt %, or less than about 0.01 wt % calcium, inclusive of all values and ranges therebetween.

In some embodiments, the produced $Li_2CO_3$ can include less than about 100 wt ppm copper In some embodiments, the produced $Li_2CO_3$ can include less than about 90 wt ppm, less than about 80 wt ppm, less than about 70 wt ppm, less than about 60 wt ppm, less than about 50 wt ppm, less than about 40 wt ppm, less than about 30 wt ppm, less than about 20 wt ppm, less than about 10 wt ppm, less than about 9 wt ppm, less than about 8 wt ppm, less than about 7 wt ppm, less than about 6 wt ppm, less than about 5 wt ppm, less than about 4 wt ppm, less than about 3 wt ppm, less than about 2 wt ppm, less than about 1 wt ppm, less than about 0.9 wt ppm, less than about 0.8 wt ppm, less than about 0.7 wt ppm, less than about 0.6 wt ppm, less than about 0.5 wt ppm, less than about 0.4 wt ppm, less than about 0.3 wt ppm, less than about 0.2 wt ppm, less than about 0.1 wt ppm, less than about 0.09 wt ppm, less than about 0.08 wt ppm, less than about 0.07 wt ppm, less than about 0.06 wt ppm, less than about 0.05 wt ppm, less than about 0.04 wt ppm, less than about 0.03 wt ppm, less than about 0.02 wt ppm, or less than about 0.01 wt ppm copper, inclusive of all values and ranges therebetween.

In some embodiments, the produced $Li_2CO_3$ can include less than about 100 wt ppm iron. In some embodiments, the produced $Li_2CO_3$ can include less than about 90 wt ppm, less than about 80 wt ppm, less than about 70 wt ppm, less than about 60 wt ppm, less than about 50 wt ppm, less than about 40 wt ppm, less than about 30 wt ppm, less than about 20 wt ppm, less than about 10 wt ppm, less than about 9 wt ppm, less than about 8 wt ppm, less than about 7 wt ppm, less than about 6 wt ppm, less than about 5 wt ppm, less than about 4 wt ppm, less than about 3 wt ppm, less than about 2 wt ppm, less than about 1 wt ppm, less than about 0.9 wt ppm, less than about 0.8 wt ppm, less than about 0.7 wt ppm, less than about 0.6 wt ppm, less than about 0.5 wt ppm, less than about 0.4 wt ppm, less than about 0.3 wt ppm, less than about 0.2 wt ppm, less than about 0.1 wt ppm, less than about 0.09 wt ppm, less than about 0.08 wt ppm, less than about 0.07 wt ppm, less than about 0.06 wt ppm, less than about 0.05 wt ppm, less than about 0.04 wt ppm, less than about 0.03 wt ppm, less than about 0.02 wt ppm, or less than about 0.01 wt ppm iron, inclusive of all values and ranges therebetween.

In some embodiments, the produced $Li_2CO_3$ can include less than about 100 wt ppm zinc. In some embodiments, the produced $Li_2CO_3$ can include less than about 90 wt ppm, less than about 80 wt ppm, less than about 70 wt ppm, less than about 60 wt ppm, less than about 50 wt ppm, less than about 40 wt ppm, less than about 30 wt ppm, less than about 20 wt ppm, less than about 10 wt ppm, less than about 9 wt ppm, less than about 8 wt ppm, less than about 7 wt ppm, less than about 6 wt ppm, less than about 5 wt ppm, less than about 4 wt ppm, less than about 3 wt ppm, less than about 2 wt ppm, less than about 1 wt ppm, less than about 0.9 wt ppm, less than about 0.8 wt ppm, less than about 0.7 wt ppm, less than about 0.6 wt ppm, less than about 0.5 wt ppm, less than about 0.4 wt ppm, less than about 0.3 wt ppm, less than about 0.2 wt ppm, less than about 0.1 wt ppm, less than about 0.09 wt ppm, less than about 0.08 wt ppm, less than about 0.07 wt ppm, less than about 0.06 wt ppm, less than about 0.05 wt ppm, less than about 0.04 wt ppm, less than about 0.03 wt ppm, less than about 0.02 wt ppm, or less than about 0.01 wt ppm zinc, inclusive of all values and ranges therebetween.

In some embodiments, the produced $Li_2CO_3$ can include less than about 100 wt ppm aluminum. In some embodiments, the produced $Li_2CO_3$ can include less than about 90 wt ppm, less than about 80 wt ppm, less than about 70 wt ppm, less than about 60 wt ppm, less than about 50 wt ppm, less than about 40 wt ppm, less than about 30 wt ppm, less than about 20 wt ppm, less than about 10 wt ppm, less than about 9 wt ppm, less than about 8 wt ppm, less than about 7 wt ppm, less than about 6 wt ppm, less than about 5 wt ppm, less than about 4 wt ppm, less than about 3 wt ppm, less than about 2 wt ppm, less than about 1 wt ppm, less than about 0.9 wt ppm, less than about 0.8 wt ppm, less than about 0.7 wt ppm, less than about 0.6 wt ppm, less than about 0.5 wt ppm, less than about 0.4 wt ppm, less than about 0.3 wt ppm, less than about 0.2 wt ppm, less than about 0.1 wt ppm, less than about 0.09 wt ppm, less than about 0.08 wt ppm, less than about 0.07 wt ppm, less than about 0.06 wt ppm, less than about 0.05 wt ppm, less than about 0.04 wt ppm, less than about 0.03 wt ppm, less than about 0.02 wt ppm, or less than about 0.01 wt ppm aluminum, inclusive of all values and ranges therebetween.

In some embodiments, the produced $Li_2CO_3$ can include less than about 100 wt ppm nickel. In some embodiments, the produced $Li_2CO_3$ can include less than about 90 wt ppm, less than about 80 wt ppm, less than about 70 wt ppm, less than about 60 wt ppm, less than about 50 wt ppm, less than about 40 wt ppm, less than about 30 wt ppm, less than about 20 wt ppm, less than about 10 wt ppm, less than about 9 wt ppm, less than about 8 wt ppm, less than about 7 wt ppm, less than about 6 wt ppm, less than about 5 wt ppm, less than about 4 wt ppm, less than about 3 wt ppm, less than about 2 wt ppm, less than about 1 wt ppm, less than about 0.9 wt ppm, less than about 0.8 wt ppm, less than about 0.7 wt ppm, less than about 0.6 wt ppm, less than about 0.5 wt ppm, less than about 0.4 wt ppm, less than about 0.3 wt ppm, less than about 0.2 wt ppm, less than about 0.1 wt ppm, less than about 0.09 wt ppm, less than about 0.08 wt ppm, less than about 0.07 wt ppm, less than about 0.06 wt ppm, less than about 0.05 wt ppm, less than about 0.04 wt ppm, less than about 0.03 wt ppm, less than about 0.02 wt ppm, or less than about 0.01 wt ppm nickel, inclusive of all values and ranges therebetween. In some embodiments, the method 10 can produce other lithium-containing compounds, such as LiOH, lithium phosphate ($Li_3PO_4$), and/or lithium chloride (LiCl).

In some embodiments, the produced $Li_2CO_3$ can include less than about 100 wt ppm non-lithium alkali metal. In some embodiments, the produced $Li_2CO_3$ can include less than about 90 wt ppm, less than about 80 wt ppm, less than about 70 wt ppm, less than about 60 wt ppm, less than about 50 wt ppm, less than about 40 wt ppm, less than about 30 wt ppm, less than about 20 wt ppm, less than about 10 wt ppm, less than about 9 wt ppm, less than about 8 wt ppm, less than about 7 wt ppm, less than about 6 wt ppm, less than about 5 wt ppm, less than about 4 wt ppm, less than about 3 wt ppm, less than about 2 wt ppm, less than about 1 wt ppm, less than about 0.9 wt ppm, less than about 0.8 wt ppm, less than about 0.7 wt ppm, less than about 0.6 wt ppm, less than about 0.5 wt ppm, less than about 0.4 wt ppm, less than about 0.3 wt ppm, less than about 0.2 wt ppm, less than about 0.1 wt ppm, less than about 0.09 wt ppm, less than about 0.08 wt ppm, less than about 0.07 wt ppm, less than about 0.06 wt ppm, less than about 0.05 wt ppm, less than about 0.04 wt ppm, less than about 0.03 wt ppm, less than about 0.02 wt ppm, or less than about 0.01 wt ppm non-lithium alkali metal, inclusive of all values and ranges therebetween.

In some embodiments, the produced $Li_2CO_3$ can include less than about 100 wt ppm alkaline earth metal. In some embodiments, the produced $Li_2CO_3$ can include less than about 90 wt ppm, less than about 80 wt ppm, less than about 70 wt ppm, less than about 60 wt ppm, less than about 50 wt ppm, less than about 40 wt ppm, less than about 30 wt ppm, less than about 20 wt ppm, less than about 10 wt ppm, less than about 9 wt ppm, less than about 8 wt ppm, less than about 7 wt ppm, less than about 6 wt ppm, less than about 5 wt ppm, less than about 4 wt ppm, less than about 3 wt ppm, less than about 2 wt ppm, less than about 1 wt ppm, less than about 0.9 wt ppm, less than about 0.8 wt ppm, less than about 0.7 wt ppm, less than about 0.6 wt ppm, less than about 0.5 wt ppm, less than about 0.4 wt ppm, less than about 0.3 wt ppm, less than about 0.2 wt ppm, less than about 0.1 wt ppm, less than about 0.09 wt ppm, less than about 0.08 wt ppm, less than about 0.07 wt ppm, less than about 0.06 wt ppm, less than about 0.05 wt ppm, less than about 0.04 wt ppm, less than about 0.03 wt ppm, less than about 0.02 wt ppm, or less than about 0.01 wt ppm alkaline earth metal, inclusive of all values and ranges therebetween.

In some embodiments, the produced $Li_2CO_3$ can include less than about 100 wt ppm transition metals. In some embodiments, the produced $Li_2CO_3$ can include less than about 90 wt ppm, less than about 80 wt ppm, less than about 70 wt ppm, less than about 60 wt ppm, less than about 50 wt ppm, less than about 40 wt ppm, less than about 30 wt ppm, less than about 20 wt ppm, less than about 10 wt ppm, less than about 9 wt ppm, less than about 8 wt ppm, less than about 7 wt ppm, less than about 6 wt ppm, less than about 5 wt ppm, less than about 4 wt ppm, less than about 3 wt ppm, less than about 2 wt ppm, less than about 1 wt ppm, less than about 0.9 wt ppm, less than about 0.8 wt ppm, less than about 0.7 wt ppm, less than about 0.6 wt ppm, less than about 0.5 wt ppm, less than about 0.4 wt ppm, less than about 0.3 wt ppm, less than about 0.2 wt ppm, less than about 0.1 wt ppm, less than about 0.09 wt ppm, less than about 0.08 wt ppm, less than about 0.07 wt ppm, less than about 0.06 wt ppm, less than about 0.05 wt ppm, less than about 0.04 wt ppm, less than about 0.03 wt ppm, less than about 0.02 wt ppm, or less than about 0.01 wt ppm transition metals, inclusive of all values and ranges therebetween.

In some embodiments, the produced $Li_2CO_3$ can include less than about 100 wt ppm metalloids. In some embodiments, the produced $Li_2CO_3$ can include less than about 90 wt ppm, less than about 80 wt ppm, less than about 70 wt ppm, less than about 60 wt ppm, less than about 50 wt ppm, less than about 40 wt ppm, less than about 30 wt ppm, less than about 20 wt ppm, less than about 10 wt ppm, less than about 9 wt ppm, less than about 8 wt ppm, less than about 7 wt ppm, less than about 6 wt ppm, less than about 5 wt ppm, less than about 4 wt ppm, less than about 3 wt ppm, less than about 2 wt ppm, less than about 1 wt ppm, less than about 0.9 wt ppm, less than about 0.8 wt ppm, less than about 0.7 wt ppm, less than about 0.6 wt ppm, less than about 0.5 wt ppm, less than about 0.4 wt ppm, less than about 0.3 wt ppm, less than about 0.2 wt ppm, less than about 0.1 wt ppm, less than about 0.09 wt ppm, less than about 0.08 wt ppm, less than about 0.07 wt ppm, less than about 0.06 wt ppm, less than about 0.05 wt ppm, less than about 0.04 wt ppm, less than about 0.03 wt ppm, less than about 0.02 wt ppm, or less than about 0.01 wt ppm metalloids, inclusive of all values and ranges therebetween.

Figure 2:
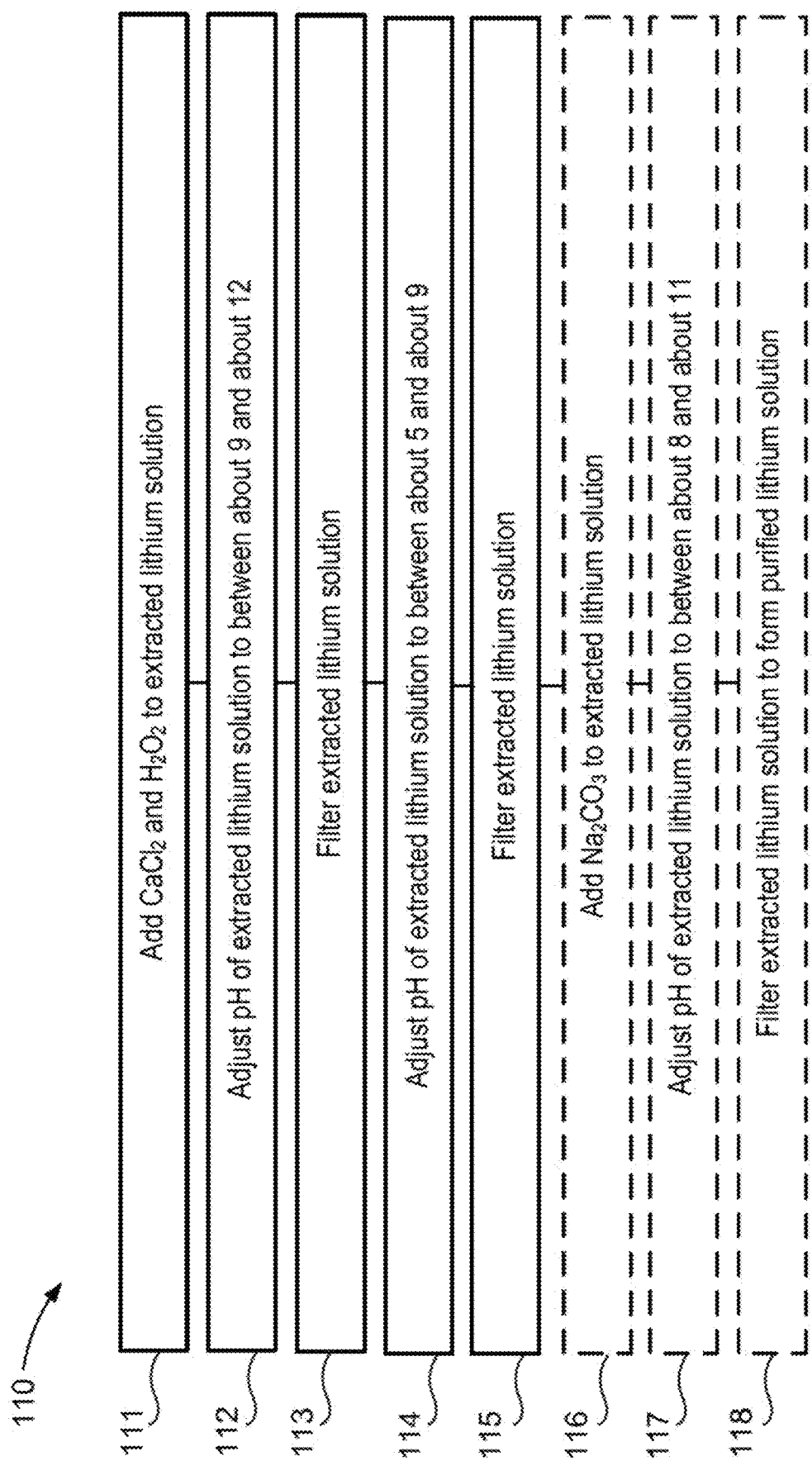
FIG. 2 is a flow diagram of a method of processing an extracted lithium solution, according to an embodiment.

FIG. 2 is a flow diagram of a method 110 of processing an extracted lithium solution, according to an embodiment. As shown, the method 110 includes adding $CaCl_2$ to an extracted lithium solution at step 111, adjusting the pH of the extracted lithium solution to between about 10 and about 12 at step 112, filtering the extracted lithium solution at step 113, adjusting the pH of the extracted lithium solution to between about 5 and about 9 at step 114, filtering the extracted lithium solution at step 115, optionally adding $Na_2CO_3$ to the extracted lithium solution at step 116, optionally adjusting the pH of the extracted lithium solution to between about 8 and about 11 at step 117, and optionally filtering the extracted lithium solution to form a purified lithium solution at step 118.

Step 111 includes adding $CaCl_2$ to the extracted lithium solution. In some embodiments, the extracted lithium solution can be the same or substantially similar to the extracted lithium solution formed at step 12, as described above with respect to FIG. 1. In some embodiments, step 111 can include adding $H_2O_2$ to the extracted lithium solution. In some embodiments, the $CaCl_2$ can be added in an amount to at least react stoichiometrically with all of the dissolved phosphate in the extracted lithium solution when at least about 0.10%, at least about 10%, at least about 1%, at least about 2%, at least about 3%, at least about 4%, at least about 5%, at least about 6%, at least about 7%, at least about 8%, at least about 9%, at least about 10% of phosphate from the lithium source (e.g., originating from a LFP or LFP derivative lithium source) is leached out during oxidation extraction (e.g., at step 11).

In some embodiments, the amount of $H_2O_2$ added during step 111 can at least oxidize stoichiometrically all of the Fe(II) in the extracted lithium solution to form Fe(III) when at least about 0.1%, at least about 1%, at least about 1%, at least about 2%, at least about 3%, at least about 4%, at least about 5%, at least about 6%, at least about 7%, at least about 8%, at least about 9%, at least about 10% m the lithium source (e.g., originating from a LFP or LFP derivative lithium source) is leached out as Fe(II) during the oxidation extraction (e.g., at step 11). By adding $H_2O_2$, Fe (II) in the solution can be oxidized to Fe (III).

Step 112 includes adjusting the pH of the extracted lithium solution to a value between about 10 and about 12. In some embodiments, step 112 includes adjusting the pH of the extracted lithium solution to a value between about 9 and about 10. In some embodiments, the pH of the extracted lithium solution can be adjusted to a value of about 9, about 9.5, about 10, about 10.5, about 11, about 11.5, or about 12, inclusive of all values and ranges therebetween. Adjustment of the pH to such a value can precipitate Fe, Cu, Co, Mg, Mn, Ni, and/or Zn ions. In some embodiments, the adjustment of the pH to a value between about 10 and about 12 can be via the addition of NaOH and/or KOH to the extracted lithium solution. In some embodiments, phosphate ions in the extracted lithium solution can be precipitated via the addition of $CaCl_2$, (e.g., in the form of $Ca_3(PO_4)$ can be precipitated via the addition of calcium ions.

Step 113 includes filtering the extracted lithium solution to remove the precipitated impurities. Step 114 includes adjusting the pH of the extracted lithium solution to between about 9. In some embodiments, the pH of the extracted lithium solution can be to about 5, about 5.5, about 6, about 6.5, about 7, about 7.5, about 8, about 8.5, or about 9, inclusive of all values and ranges therebetween. The adjustment of the pH to a value between about 5 and about 9 can aid in precipitating aluminum impurities. In some embodiments, the pH adjustment at step 114 can be via addition of an acid to the extracted lithium solution. Step 115 includes another repetition of filtering. The filtering at step 115 can remove the aluminum impurities from the extracted lithium solution.

Step 116 is optional and includes adding $Na_2CO_3$ to the extracted lithium solution. The $Na_2CO_3$ can aid in precipitating calcium ions from the extracted lithium solution. Step 117 is optional and includes adjusting the pH of the extracted lithium solution to a value between about 8 and about 11. In some embodiments, the adjustment can be to a value of about 8, about 8.5, about 9, about 9.5, about 10, about 10.5, or about 11, inclusive of all values and ranges therebetween. In some embodiments, the pH can be adjusted to a value of at least about 8, at least about 8.5, at least about 9, at least about 9.5, at least about 10, or at least about 10.5. In some embodiments, the adjustment of the pH can be facilitated by the addition of $Na_2CO_3$. The adjustment of the pH can aid in precipitating the calcium ions.

Step 118 is optional and includes filtering the extracted lithium solution to form a purified lithium solution. In some embodiments, the filtering at step 113, step 115, and/or step 118 can include filtration, centrifugation, sedimentation, decanting, or a combination thereof. In some embodiments, the steps of the method 110 can be performed in any sequence or with any of the steps omitted. In some embodiments, additional purification steps or repeated purification steps can be added to further increase the purity of the purified lithium solution.

In some embodiments, the pH adjustment of step 114 and the filtration of step 115 can be performed before the pH adjustment step 112 and filtration step 113. In some embodiments, step 117 can be excluded when the pH adjustment at step 114 and the filtration at step 115 are performed before the pH adjustment at step 112 and filtration at step 113.

In some embodiments, the method 110 can include a step that partially evaporating the extracted lithium solution. The evaporation can ensure the end volume of the extracted lithium solution is at least the amount that can dissolve all lithium salts in the solution at all temperatures between room temperature and the evaporating temperature. In some embodiments, Na and/or K salts can precipitate after evaporation. In some embodiments, the evaporation step can include removing the precipitates. In some embodiments, the precipitated Na and/or K salts are removed via filtration, centrifugation, sedimentation and decanting, or a combination thereof. In some embodiments, the evaporation step can occur before step 111. In some embodiments, the evaporation step can occur after step 111 and before step 112. In some embodiments, the evaporation step can occur after step 113 and before step 114. In some embodiments, the evaporation step can occur after step 115 and before step 116. In some embodiments, the evaporation step can occur just before the ion-exchange resin treatment described below.

In some embodiments, step 116 is optional. In some embodiments, steps 112 and 113 happen after steps 114 and 115, and steps 116, 117, and 118 are optional. In some embodiments, method 110 can include a step to run the extracted lithium solution through the ion-exchange resin to remove Ca and/or Mg ions in the extracted lithium solution. In some embodiments, the ion-exchange resin treatment removes Al ions in the extracted lithium solution. In some embodiments, the ion-exchange resins are in their lithium form. In some embodiments, the ion-exchange resins are in other cation forms including Na and K. In some embodiments, a partial evaporation step is performed before the ion-exchange resin treatment. In some embodiments, the ion-exchange resin treatment happens after step 112 and step 113. In some embodiments, steps 112 and 113 happen after steps 114 and 115, and the ion-exchange resin treatment happens after steps 112 and 113. In some embodiments, the ion-exchange resin treatment happens after step 118. In some embodiments, the ion-exchange resin treatment happens at the end of the method 110.

Figure 3:
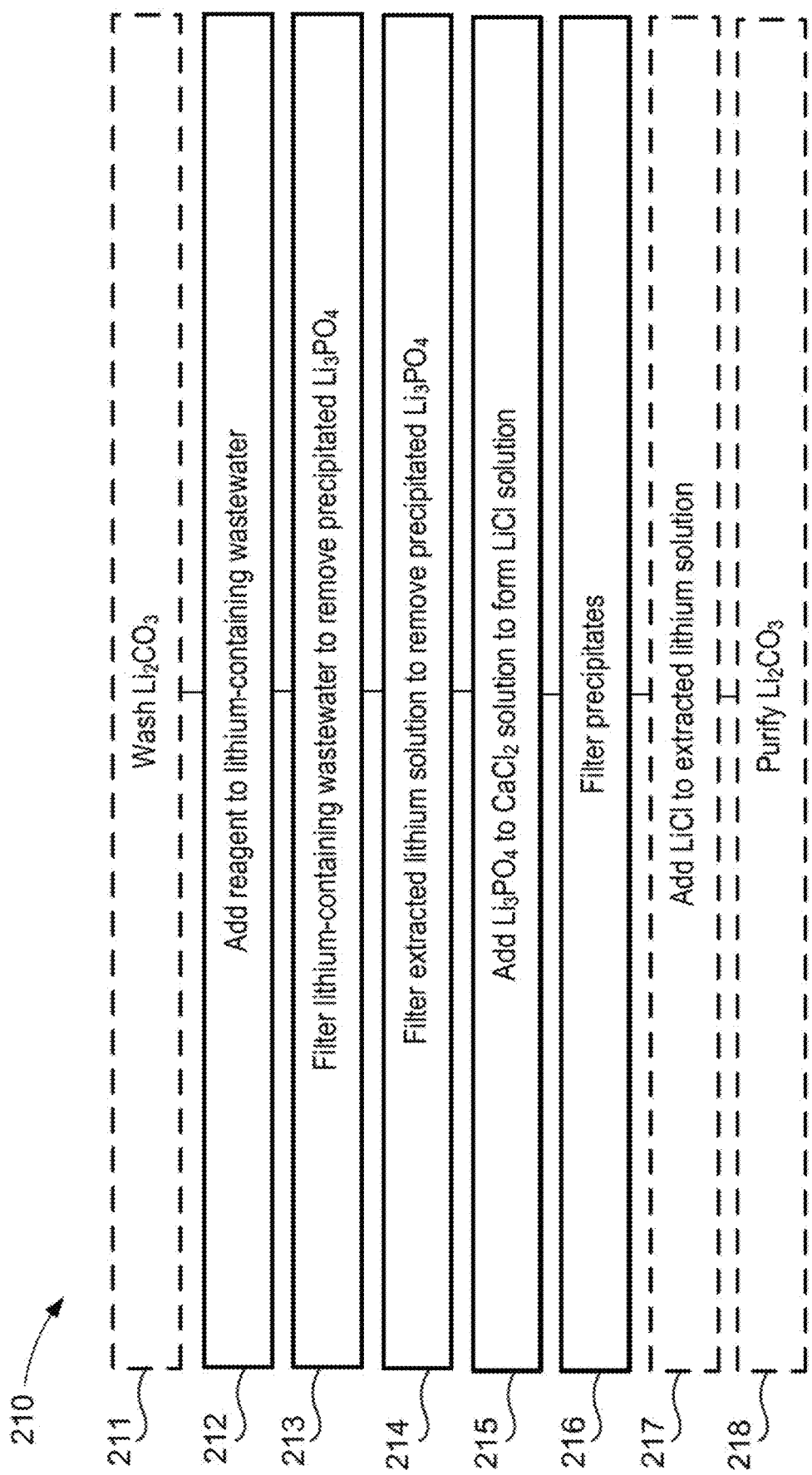
FIG. 3 is a flow diagram of a method of processing lithium-containing wastewater, according to an embodiment.

FIG. 3 is a flow diagram of a method 210 of processing lithium-containing wastewater, according to an embodiment. As shown, the method 210 optionally includes washing $Li_2CO_3$ at step 211, adding reagent to a lithium-containing wastewater at step 212, filtering the lithium-containing wastewater to remove the precipitated $Li_3PO_4$ at step 213, filtering an extracted lithium solution to remove precipitated $Li_3PO_4$ at step 214, adding $Li_3PO_4$ to a $CaCl_2$ solution to form a LiCl solution at step 215, filter precipitates at step 216, optionally adding LiCl to an extracted lithium solution at step 217, and optionally purifying $Li_2CO_3$ at step 218.

Step 211 is optional and includes washing $Li_2CO_3$. In some embodiments, the $Li_2CO_3$ can be precipitated from a lithium source (e.g., the method 10, as described above with reference to FIG. 1). In some embodiments, the washing can be via water. The washing can improve the purity of the $LiCO_2$ and dissolve or otherwise carry away precipitates. Step 212 includes adding a reagent to the lithium-containing wastewater. In some embodiments, the lithium-containing wastewater can originate from a $Li_2CO_3$ production process (e.g., the method 10, as described above with reference to FIG. 1). In some embodiments, the lithium-containing wastewater can include precipitation wastewater (e.g., as produced in step 16, described above with reference to FIG. 1) and purification wastewater (e.g., as produced from the washing process that further purifies the $Li_2CO_3$ product. In some embodiments, the precipitation wastewater has been subject to a precipitation step but still contains dissolved lithium. In some embodiments, the dissolved lithium can be in the form of $Li_2CO_3$. In some embodiments, the molar ratio of Na and/or K to Li in the precipitation wastewater can be greater than about 5:1, greater than about 6:1, greater than about 7:1, greater than about 8:1, greater than about 9:1, greater than about 10:1, greater than about 15:1, greater than about 20:1, greater than about 25:1, greater than about 30:1, or greater than about 35:1. In some embodiments, the molar ratio of Na and/or K in the precipitation wastewater can be no more than about 5:1. In some embodiments, the molar ratio of Na and/or K to Li in the precipitation wastewater can be at least about 35:1.

In some embodiments, the purification wastewater also includes dissolved lithium. In some embodiments, the dissolved lithium can be in the form of $Li_2CO_3$. In some embodiments, the molar ratio of Na and/or K to Li in the purification wastewater can be no more than about 4:1, no more than about 3:1, no more than about 2:1, no more than about 1:1, no more than about 0.5:1, no more than about 0.1:1, or no more than about 0.1:1. In some embodiments, the molar ratio of Na and/or K to Li in the purification wastewater can be greater than about 4:1. In some embodiments, the lithium-containing wastewater can be recycled to extract $Li_2CO_3$. This wastewater recycling process can also reduce the amount of overall waste from lithium extraction and can increase the overall yield of lithium carbonate from lithium extraction.

In some embodiments, the reagent added at step 212 can include a phosphate. In some embodiments, the reagent added at step 212 can include $Na_3PO_4$, potassium phosphate ($K_3PO_4$), and/or ammonium phosphate (($NH_4)_3PO_4$). In some embodiments, the $Na_3PO_4$ can precipitate the Li out of the lithium-containing wastewater. In some embodiments, the $Na_3PO_4$ cam react with the dissolved lithium and precipitate the lithium out as $Li_3PO_4$. In some embodiments, the $Li_3PO_4$ can be precipitated at a pH of greater than about 4, greater than about 5, greater than about 6, greater than about 7, greater than about 8, greater than about 9, or greater than about 10. In some embodiments, the $Li_3PO_4$ can be precipitated at a pH of greater than about 11. $Li_3PO_4$ can be precipitated at a temperature greater than about 50° C., greater than about 60° C., greater than about 70° C., greater than about 80° C., or greater than about 90° C. In some embodiments, the phosphate added to the lithium-containing wastewater can be at least about 1.0, at least about 1.5, at least about 2.0, at least about 2.5, or at least about 3.0 times the stoichiometry amount needed to precipitate all lithium from the lithium-containing wastewater. In some embodiments, the phosphates are dissolved in water and filtered to remove any insoluble impurities before adding to the lithium-containing wastewater. In some embodiments, the dissolved $Li_2CO_3$ in the wastewater are first converted into more soluble lithium salts by adding acids, such as HCl or $H_2SO_4$, prior to the adding of $Na_3PO_4$. In some embodiments, the dissolved $Li_2CO_3$ turns into LiCl by the addition of HCl. In some embodiments, the dissolved $Li_2CO_3$ turns into $Li_2SO_4$ by the addition of $H_2SO_4$.

Step 213 includes filtering the lithium-containing wastewater to remove precipitated $Li_3PO_4$. Step 214 includes filtering the extracted lithium solution to remove precipitated $Li_3PO_4$. In some embodiments, the extracted lithium solution can originate from an oxidation extraction process (e.g., step 12, as described above with reference to FIG. 1). In some embodiments, the filtering at step 213 and/or step 214 can include filtration, centrifugation, sedimentation, decanting, or any combination thereof to isolate the $Li_3PO_4$. In some embodiments, the collected $Li_3PO_4$ can be washed with water to further remove Na and/or K impurities to produce high-purity $Li_3PO_4$. In some embodiments, the filtration at step 213 and/or step 214 produces $Li_3PO_4$ with a purity of at least about 95 wt %, at least about 96 wt %, at least about 97 wt %, at least about 98 wt %, at least about 99.5 wt %, at least about 99.6 wt %, at least about 99.7 wt %, at least about 99.8 wt %, or at least about 99.9 wt %, inclusive of all values and ranges therebetween. In some embodiments, the high-purity $Li_3PO_4$ can be directly reused as a precursor for the production of LFP cathode materials or LFP derivative cathode materials. In some embodiments, the high-purity $Li_3PO_4$ can be directly used in other industries or production processes.

At step 215, the $Li_3PO_4$ is added to a $CaCl_2$ solution to convert $Li_3PO_4$ into a soluble LiCl solution. Step 216 includes filtration of precipitates. The $Li_3PO_4$ reacts with $CaCl_2$ to form soluble LiCl and $Ca_3(PO_4)_2$ precipitation. In some embodiments, the $Ca_3(PO_4)_2$ precipitation can be separated and removed by removed by filtration, centrifugation, sedimentation, or decanting, or a combination thereof, resulting in a solution containing LiCl. In some embodiments, the solution is heated to a temperature of at least about 70° C., at least about 75° C., at least about 80°

C., at least about 85° C., at least about 90° C., or at least about 95° C. to convert the $Li_3PO_4$ into soluble LiCl. In some embodiments, the solution is heated to a temperature of no more than about 100° C., no more than about 95° C., no more than about 90° C., no more than about 85° C., no more than about 80° C., or no more than about 75° C. to convert the $Li_3PO_4$ into soluble LiCl. Combinations of the above-referenced temperatures are also possible (e.g., at least about 70° C. and no more than about 100° C. or at least about 75° C. and no more than about 95° C.), inclusive of all values and ranges therebetween. In some embodiments, the solution is heated to a temperature of about 70° C., about 75° C., about 80° C., about 85° C., about 90° C., about 95° C., or about 100° C. to convert the $Li_3PO_4$ into soluble LiCl.

In some embodiments, the formation of the soluble LiCl can occur over a time period of at least about 1 hour, at least about 2 hours, at least about 3 hours, at least about 4 hours, at least about 5 hours, at least about 6 hours, at least about 7 hours, at least about 8 hours, at least about 9 hours, or at least about 10 hours, inclusive of all values and ranges therebetween. In some embodiments, the formation of soluble LiCl can occur at a pH of about 7, about 8, about 9, about 10, about 11, about 12, about 13, or about 14, inclusive of all values and ranges therebetween. In some embodiments, no detectable Na and/or K can be present in the LiCl solution. In some embodiments, the molar ratio of Na and/or K to Li in the LiCl solution can be less than about 1.5:1, less than about 1:1, less than about 0.5:1, less than about 0.4:1, less than about 0.3:1, less than about 0.2:1, less than about 0.1:1, or less than about 0.01:1.

In some embodiments, the LiCl solution can be subject to a calcium impurity removal step to remove residual calcium in the LiCl solution. In some embodiments, calcium can be removed by reacting and precipitating the calcium in solution. In some embodiments, the calcium is precipitated by adding at least one compound containing carbonate to the LiCl solution. Calcium precipitates as $CaCO_3$ and is then removed from the LiCl solution. In some embodiments, $Na_2CO_3$ and/or $K_2CO_3$ can be added to the LiCl solution to precipitate the calcium. In some embodiments, the amount of carbonate added to the LiCl solution can be in excess of the stoichiometric amount of calcium to ensure the efficient and/or effective removal of the calcium ions. In some embodiments, the excess carbonate does not react to form $Li_2CO_3$ that is beyond the solubility of the LiCl solution.

In some embodiments, calcium can be removed from the LiCl solution by adding hydroxide to the LiCl solution. Calcium can then precipitate as $Ca(OH)_2$ and is then removed form the LiCl solution. In some embodiments, NaOH and/or KOH are added to the LiCl solution to precipitate the calcium. In some embodiments, the pH of the LiCl solution can be maintained at a level of at least about 10, at least about 10.5, at least about 11, at least about 11.5, at least about 12, at least about 12.5, at least about 13, at least about 13.5, or at least about 14 to efficiently remove the calcium ions from the LiCl solution. The LiCl solution can then undergo precipitation and purification to produce a high purity $Li_2CO_3$. In some embodiments, the low Na and/or K concentration of the LiCl solution can allow for more evaporation or removal of water in solution during precipitation of the lithium and can result in a higher yield due to the lower amount of $Li_2CO_2$ dissolution.

At step 217, the LiCl solution is optionally combined with an extracted lithium solution (e.g., the extracted lithium solution formed at step 11). The combined solution containing the LiCl solution and the extracted lithium solution can be further purified at step 218. The impurity removal can include lithium precipitation and purification to produce lithium carbonate. In some embodiments, the lithium-containing wastewater produced from the combination of the LiCl solution and the extracted lithium solution can be recycled and further processed (e.g., as described above with reference In some embodiments, the LiCl solution can be combined with the lithium-containing wastewater prior to the addition of the reagent to the lithium-containing wastewater at step 212. In some embodiments, the LiCl can enhance the purification process of the $Li_2CO_3$. In some embodiments, remaining lithium-containing wastewater can be processed multiple times via the method 210. This can allow more lithium to be extracted from the lithium-containing wastewater. In some embodiments, the purification wastewater described above with respect to step 212 can be recycled separately by evaporating the purification wastewater to precipitate out dissolved $Li_2CO_3$. In some embodiments, the final volume evaporated can be enough to dissolve all of the sodium salts in the purification wastewater.

In some embodiments, the method 210 can produce $Li_2CO_3$ with an overall purity of at least about 70 wt %, at least about 75 wt %, at least about 80 wt %, at least about 85 wt %, at least about 90 wt %, at least about 92 wt %, at least about 95 wt %, at least about 96 wt %, at least about 97 wt %, at least about 98 wt %, or at least about 99 wt %. In some embodiments, the method 210 can produce battery grade $Li_2CO_3$ with an overall purity of at least about 99.5 wt %. In some embodiments, the method 210 can produce enhanced battery grade $Li_2CO_3$ with an overall purity of at least about 99.9 wt %. In some embodiments, the method 210 can produce superior battery grade $Li_2CO_3$ with an overall purity of at least about 99.99 wt %.

In some embodiments, the produced $Li_2CO_3$ can include no more than about 1 wt %, no more than about 0.9 wt %, no more than about 0.8 wt %, no more than about 0.7 wt %, no more than about 0.6 wt %, no more than about 0.5 wt %, no more than about 0.4 wt %, no more than about 0.3 wt %, no more than about 0.2 wt %, no more than about 0.1 wt %, no more than about 0.09 wt %, no more than about 0.08 wt %, no more than about 0.07 wt %, no more than about 0.06 wt %, no more than about 0.05 wt %, no more than about 0.04 wt %, no more than about 0.03 wt %, no more than about 0.02 wt %, or no more than about 0.01 wt % sodium.

In some embodiments, the produced $Li_2CO_3$ can include no more than about 1 wt %, no more than about 0.9 wt %, no more than about 0.8 wt %, no more than about 0.7 wt %, no more than about 0.6 wt %, no more than about 0.5 wt %, no more than about 0.4 wt %, no more than about 0.3 wt %, no more than about 0.2 wt %, no more than about 0.1 wt %, no more than about 0.09 wt %, no more than about 0.08 wt %, no more than about 0.07 wt %, no more than about 0.06 wt %, no more than about 0.05 wt %, no more than about 0.04 wt %, no more than about 0.03 wt %, no more than about 0.02 wt %, or no more than about 0.01 wt % calcium.

In some embodiments, the produced $Li_2CO_3$ can include no more than about 100 wt ppm, no more than about 90 wt ppm, no more than about 80 wt ppm, no more than about 70 wt ppm, no more than about 60 wt ppm, no more than about 50 wt ppm, no more than about 40 wt ppm, no more than about 30 wt ppm, no more than about 20 wt ppm, no more than about 10 wt ppm, no more than about 9 wt ppm, no more than about 8 wt ppm, no more than about 7 wt ppm, no more than about 6 wt ppm, no more than about 5 wt ppm, no more than about 4 wt ppm, no more than about 3 wt ppm, no more than about 2 wt ppm, no more than about 1 wt ppm, no more than about 0.9 wt ppm, no more than about 0.8 wt ppm, no more than about 0.7 wt ppm, no more than about 0.6 wt ppm, no more than about 0.5 wt ppm, no more than about 0.4 wt ppm, no more than about 0.3 wt ppm, no more than about 0.2 wt ppm, no more than about 0.1 wt ppm no more than about 0.09 wt ppm, no more than about 0.08 wt ppm, no more than about 0.07 wt ppm, no more than about 0.06 wt ppm, no more than about 0.05 wt ppm, no more than about 0.04 wt ppm, no more than about 0.03 wt ppm, no more than about 0.02 wt ppm, or no more than about 0.01 wt ppm copper.

In some embodiments, the produced $Li_2CO_3$ can include no more than about 100 wt ppm, no more than about 90 wt ppm, no more than about 80 wt ppm, no more than about 70 wt ppm, no more than about 60 wt ppm, no more than about 50 wt ppm, no more than about 40 wt ppm, no more than about 30 wt ppm, no more than about 25 wt ppm, no more than about 20 wt ppm, no more than about 10 wt ppm, no more than about 9 wt ppm, no more than about 8 wt ppm, no more than about 7 wt ppm, no more than about 6 wt ppm, no more than about 5 wt ppm, no more than about 4 wt ppm, no more than about 3 wt ppm, no more than about 2 wt ppm, no more than about 1 wt ppm, no more than about 0.9 wt ppm, no more than about 0.8 wt ppm, no more than about 0.7 wt ppm, no more than about 0.6 wt ppm, no more than about 0.5 wt ppm, no more than about 0.4 wt ppm, no more than about 0.3 wt ppm, no more than about 0.2 wt ppm, no more than about 0.1 wt ppm no more than about 0.09 wt ppm, no more than about 0.08 wt ppm, no more than about 0.07 wt ppm, no more than about 0.06 wt ppm, no more than about 0.05 wt ppm, no more than about 0.04 wt ppm, no more than about 0.03 wt ppm, no more than about 0.02 wt ppm, or no more than about 0.01 wt ppm iron.

In some embodiments, the produced $Li_2CO_3$ can include no more than about 100 wt ppm, no more than about 90 wt ppm, no more than about 80 wt ppm, no more than about 70 wt ppm, no more than about 60 wt ppm, no more than about 50 wt ppm, no more than about 40 wt ppm, no more than about 30 wt ppm, no more than about 25 wt ppm, no more than about 20 wt ppm, no more than about 10 wt ppm, no more than about 9 wt ppm, no more than about 8 wt ppm, no more than about 7 wt ppm, no more than about 6 wt ppm, no more than about 5 wt ppm, no more than about 4 wt ppm, no more than about 3 wt ppm, no more than about 2 wt ppm, no more than about 1 wt ppm, no more than about 0.9 wt ppm, no more than about 0.8 wt ppm, no more than about 0.7 wt ppm, no more than about 0.6 wt ppm, no more than about 0.5 wt ppm, no more than about 0.4 wt ppm, no more than about 0.3 wt ppm, no more than about 0.2 wt ppm, no more than about 0.1 wt ppm no more than about 0.09 wt ppm, no more than about 0.08 wt ppm, no more than about 0.07 wt ppm, no more than about 0.06 wt ppm, no more than about 0.05 wt ppm, no more than about 0.04 wt ppm, no more than about 0.03 wt ppm, no more than about 0.02 wt ppm, or no more than about 0.01 wt ppm zinc.

In some embodiments, the produced $Li_2CO_3$ can include no more than about 100 wt ppm, no more than about 90 wt ppm, no more than about 80 wt ppm, no more than about 70 wt ppm, no more than about 60 wt ppm, no more than about 50 wt ppm, no more than about 40 wt ppm, no more than about 30 wt ppm, no more than about 25 wt ppm, no more than about 20 wt ppm, no more than about 10 wt ppm, no more than about 9 wt ppm, no more than about 8 wt ppm, no more than about 7 wt ppm, no more than about 6 wt ppm, no more than about 5 wt ppm, no more than about 4 wt ppm, no more than about 3 wt ppm, no more than about 2 wt ppm, no more than about 1 wt ppm, no more than about 0.9 wt ppm, no more than about 0.8 wt ppm, no more than about 0.7 wt ppm, no more than about 0.6 wt ppm, no more than about 0.5 wt ppm, no more than about 0.4 wt ppm, no more than about 0.3 wt ppm, no more than about 0.2 wt ppm, no more than about 0.1 wt ppm no more than about 0.09 wt ppm, no more than about 0.08 wt ppm, no more than about 0.07 wt ppm, no more than about 0.06 wt ppm, no more than about 0.05 wt ppm, no more than about 0.04 wt ppm, no more than about 0.03 wt ppm, no more than about 0.02 wt ppm, or no more than about 0.01 wt ppm aluminum.

In some embodiments, the produced $Li_2CO_3$ can include no more than about 100 wt ppm, no more than about 90 wt ppm, no more than about 80 wt ppm, no more than about 70 wt ppm, no more than about 60 wt ppm, no more than about 50 wt ppm, no more than about 40 wt ppm, no more than about 30 wt ppm, no more than about 25 wt ppm, no more than about 20 wt ppm, no more than about 10 wt ppm, no more than about 9 wt ppm, no more than about 8 wt ppm, no more than about 7 wt ppm, no more than about 6 wt ppm, no more than about 5 wt ppm, no more than about 4 wt ppm, no more than about 3 wt ppm, no more than about 2 wt ppm, no more than about 1 wt ppm, no more than about 0.9 wt ppm, no more than about 0.8 wt ppm, no more than about 0.7 wt ppm, no more than about 0.6 wt ppm, no more than about 0.5 wt ppm, no more than about 0.4 wt ppm, no more than about 0.3 wt ppm, no more than about 0.2 wt ppm, no more than about 0.1 wt ppm no more than about 0.09 wt ppm, no more than about 0.08 wt ppm, no more than about 0.07 wt ppm, no more than about 0.06 wt ppm, no more than about 0.05 wt ppm, no more than about 0.04 wt ppm, no more than about 0.03 wt ppm, no more than about 0.02 wt ppm, or no more than about 0.01 wt ppm nickel.

EXAMPLES

Example 1: 1,000 g of LFP scrap electrode (consisting of LFP cathode, binder, and carbon) was preprocessed through cutting of the LFP scrap electrode into 1.5 cm LFP scrap flakes and immersed in 2.5 L of water to form a mixture. Then 712 g of $Na_2S_2O_8$ powder was added to the mixture to perform an oxidation extraction step. The LFP scrap flakes were stirred in the solution for 40 min. The oxidation reaction was observed through the elevation of temperature of the solution to about 70° C. The extracted lithium solution was separated from the lithium-extracted LFP scrap electrode materials by filtration and showed a pH of about 3.5. Next, the extracted lithium solution underwent an impurity removal process. The pH of the extracted lithium solution was adjusted to about 12 by adding NaOH and the color of the solution turned green due to the presence of Fe (II). Yellow precipitation was observed after adding another 68 g of $Na_2S_2O_8$ to the solution to oxidize the Fe (II) to Fe (III). Clear and purified lithium solution was collected after filtration. The inductively couple plasma mass spectrometry (ICP) elemental analysis for the purified lithium solution (compared to the initial extracted Li solution prior to purification) is shown in Table 1. The comparison shows that most of the Al, P, Ca, Mn, and Zn impurities were removed.

Figure 4:
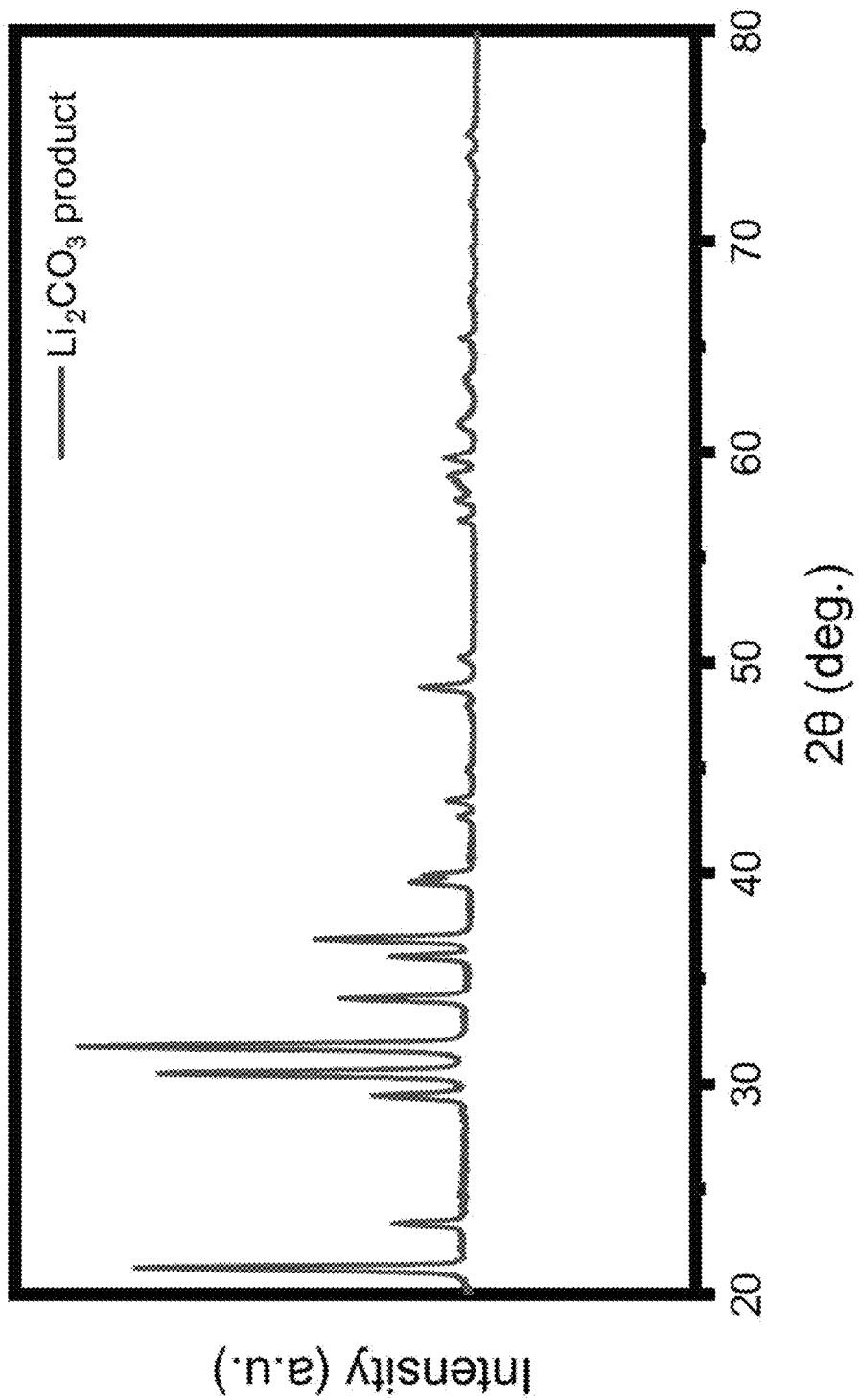
FIG. 4 shows the X-ray diffraction (XRD) pattern of lithium carbonate generated from an embodiment compared to a standard lithium carbonate XRD pattern.

Next, 300 g of $Na_2CO_3$ were fully dissolved in 1 L of water and filtered. The $Na_2CO_3$ solution was added to the purified lithium solution to perform lithium precipitation. The precipitation reaction was carried out at 90-95° C. for 4 h. The initial lithium carbonate collected went through a series of water washing at room temperature to purify the lithium carbonate. The ICP elemental analysis (Table 2) for the final lithium carbonate product shows that the Li2CO3 has a purity of at least 99.20%. Additionally, the X-ray diffraction (XRD) spectrum of the lithium carbonate product shown in FIG. 4 matches well with the standard powder XRD spectrum of lithium carbonate.

Figure 5:
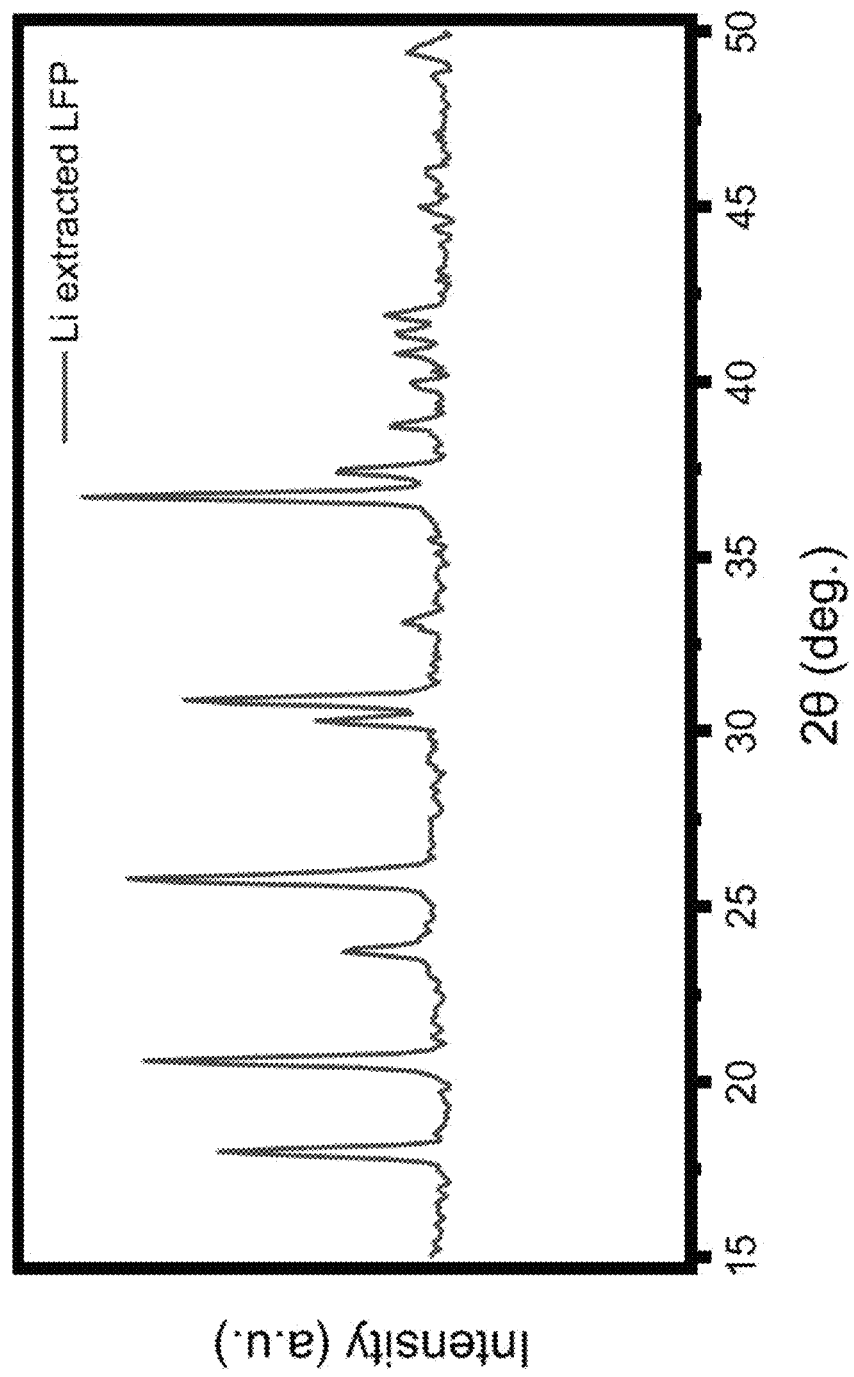
FIG. 5 shows the XRD pattern of Li-extracted iron phosphate generated from an embodiment compared to a standard iron phosphate XRD pattern.

The lithium-extracted LFP scrap electrode materials after oxidation extraction went through multiple water washes to remove any residual lithium and sodium. Although a small amount of carbon and binder can still exist in the material, all XRD patterns for $FePO_4$ are detected in the lithium-extracted LFP scrap materials as shown in FIG. 5. This result indicates that the disclosed oxidation extraction procedures can extract lithium while also retaining the olivine structure of $FePO_4$ in the lithium-extracted materials. This recovered $FePO_4$ can be further purified, used for LFP synthesis, and/or reused in another application.

Example 2: In another example, a mixture including 7.5 g of LiMn0.8Fe0.2PO4 electrode (consisting of LiMn0.8Fe0.2PO4 cathode, binder, carbon, and Al current collector), 30 g of LiFePO4 scrap electrode (consisting of LiFePO4 cathode, binder, carbon, and Al current collector), and 30 g of LiFePO4 black mass powder (consisting of LiFePO4 cathode, graphite anode, binder, carbon and a small amount of Al/Cu impurities) was used as a mixed lithium source. The electrodes were shredded into 1.5 cm flakes and mixed with the black mass powder in 200 ml of water. After 10 min of ultrasonication, 30 g of sodium persulfate was added. The solution was heated to about 75° C. for 3 h and filtration was used to collect clear lithium solution. Next, 2 ml of 30 wt % $H_2O_2$ and 1.1 g of CaCl2·2H2O were added to the solution. The pH of the solution was adjusted to 12 and the solution was heated to >80° C. for 1.5 h. A clear solution was collected after filtration. To remove the Al, the pH of the solution was then adjusted to 7 with HCl acid. The solution turned cloudy and went back to a clear solution after filtration with 1-micron filter paper. Next, the pH of the solution was adjusted to 11 and 2 g of Na2CO3 was added. Purified lithium solution was collected after 2 h of mixing and then filtration. Next, 13 g of Na2CO3 were fully dissolved in 40 ml of water and filtered. The Na2CO3 solution was added to the purified lithium solution for lithium precipitation. The precipitation reaction was carried out at 90° C. for 4 h. The initial lithium carbonate collected underwent a series of water washing at >80° C. temperature. The ICP elemental analysis for the final lithium carbonate product showed that the Li2CO3 has a purity of at least 99.20%.

Figure 6:
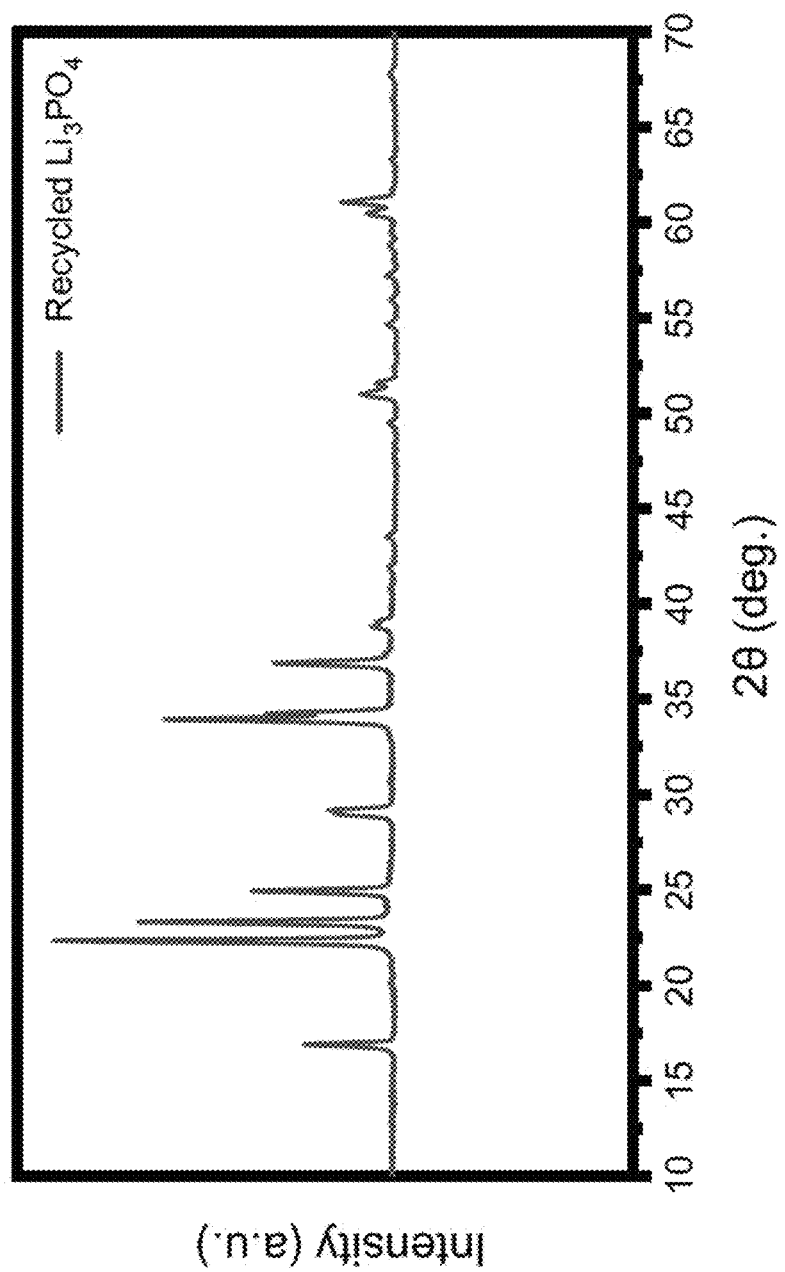
FIG. 6 shows the XRD pattern of lithium phosphate generated from an embodiment compared to a standard lithium phosphate XRD pattern.

Another example relates to recycling lithium from lithium-containing wastewater generated during the lithium extraction process. A solution containing approximately 7.5 g of Li2CO3 and 37.5 g of NaCl dissolved in 1,100 ml water was used to represent the composition of wastewater. Hydrochloric acid was added to the solution to convert all dissolved $Li_2CO_3$ into LiCl, and then the pH of the solution was adjusted to about 8. Next, 28 g of Na3PO4·12H2O was added to the solution to react with the Li and precipitate out $Li_3PO_4$. The solution was heated to about 80° C. for 3 h, and 7.0 g of $Li_3PO_4$ powder was collected. The XRD pattern of the $Li_3PO_4$ product shown in FIG. 6 matches well with the standard powder XRD spectrum of $Li_3PO_4$. Next, 5.3 g of $Li_3PO_4$ powder was added to 100 ml of water together with 11 g of $CaCl_2·2H_2O$. The solution was heated to 85° C. for 2 h to convert the $Li_3PO_4$ into LiCl solution and then filtrated. The collected LiCl solution then went through a Ca removal step. $Na_2CO_3$ of 4 g was added to the solution and stirred for 2 h. A filtration step was administered to remove $CaCO_3$ precipitate. Finally, 3.6 g of $Na_2CO_3$ was fully dissolved in 20 ml of water and filtered. The $Na_2CO_3$ solution was added to the purified LiCl solution for lithium precipitation. The precipitation reaction was carried out at 90° C. for 4 h. The initial lithium carbonate collected underwent a series of water washing at >80° C. temperature. The ICP elemental analysis for the final lithium carbonate product showed that the $Li_2CO_3$ has a purity of 99.7% (Table 3).

Another example relates to recycling lithium from LFP scrap electrode materials. Approximately 600 g of LFP scrap electrode (consisting of LFP cathode, binder, and carbon) was preprocessed through cutting of the LFP scrap electrode into 1.5 cm LFP scrap flakes and immersed in 1 L of water to form a mixture. Then, 475 g of $Na_2S_2O_8$ powder was added to the mixture to perform an oxidation extraction step. The LFP scrap flakes were stirred in the solution for 40 min. The oxidation reaction was observed through the elevation of the temperature of the solution to about 70° C. The extracted lithium solution was separated from the lithium-extracted LFP scrap electrode materials by filtration and showed a pH of about 3.5. Next, the extracted lithium solution underwent an impurity removal process. Around 15 mL of $H_2O_2$ and 32 g of $CaCl_2$ were added to the extracted lithium solution and stirred for 2 h. The pH of the extracted lithium solution was adjusted to about 6.5 by adding NaOH. The lithium solution was filtered to remove precipitates. The pH of the extracted lithium solution was then adjusted to about 10 and stirred for 1 h. The lithium solution was filtered to remove precipitates. $Na_2CO_3$ was added to the solution and stirred for 1 h. The solution was filtered to remove precipitates and then partially evaporated. The extracted lithium solution was then run through the ion-exchange resin to further remove Ca ions. Clear and purified lithium solution was collected after filtration. The ICP elemental analysis for the purified lithium solution (compared to the initial extracted Li solution prior to purification) is shown in Table 4. The comparison shows that most of the Al, P, Ca, Fe, and Zn impurities were removed.

Next, 169 g of $Na_2CO_3$ were fully dissolved in 1 L of water and filtered. The $Na_2CO_3$ solution was added to the purified lithium solution to perform lithium precipitation. The precipitation reaction was carried out at 90-95° C. for 4 h. The initial lithium carbonate collected went through a series of water washing at a temperature of 85-95° C. to purify the lithium carbonate. The lithium carbonate was then fired at 300-400° C. for 2-4 h to remove the water content. The ICP elemental analysis (Table 5) shows the impurity concentrations for the final lithium carbonate product. The $Li_2CO_3$ has a purity of at least 99.50%.

TABLE 1

ICP Elemental Analysis for Purified Lithium Solution

|  | 7 Li ppb | 23 Na ppb | 24 Mg ppb | 27 Al ppb | 31 P ppb | 34 S ppb | 35 Cl ppb | 39 K ppb | 44 Ca ppb | 47 Ti ppb |
|---|---|---|---|---|---|---|---|---|---|---|
| Initial Li solution | 7,398.7 | 29,791.4 | −0.3 | 512.1 | 577.6 | 125.3 | −0.5 | 39.5 | 45.6 | 2.8 |
| Purified Li | 9,620.1 | 45,961.9 | 2.9 | 2.4 | 1.9 | 162.2 | 0.7 | 120.4 | −48.3 | 2.3 |

TABLE 1-continued

ICP Elemental Analysis for Purified Lithium Solution

| solution | | 51 V ppb | 52 Cr ppb | 54 Fe ppb | 55 Mn ppb | 59 Co ppb | 60 Ni ppb | 65 Cu ppb | 66 Zn ppb |
|---|---|---|---|---|---|---|---|---|---|
| | Initial Li solution | −0.1 | −0.1 | −16.9 | 837.3 | 0.1 | 0.9 | 0.3 | 25.6 |
| | Purified Li solution | −0.2 | −0.1 | −16.9 | 0.1 | 0.1 | −0.6 | 1.1 | −3.0 |

TABLE 2

ICP Elemental Analysis of Lithium Carbonate Product

| | Na % | Mg % | Al % | Si % | P % | K % | Ca % | Ti % | V % |
|---|---|---|---|---|---|---|---|---|---|
| $Li_2CO_3$ product | 0.0680 | 0.0059 | 0.0010 | 0.0051 | 0.0500 | 0.0113 | 0.0314 | 0.0055 | 0.0259 |

| | Cr % | Fe % | Mn % | Co % | Ni % | Cu % | Zn % | $Li_2CO_3$ % |
|---|---|---|---|---|---|---|---|---|
| $Li_2CO_3$ product | 0.0013 | 0.0304 | 0.0001 | 0.0005 | 0.0013 | 0.0009 | 0.0026 | >99.20 |

TABLE 3

ICP Elemental Analysis of Lithium Carbonate Product

| | Na % | Mg % | Al % | Si % | P % | K % | Ca % | Ti % | V % |
|---|---|---|---|---|---|---|---|---|---|
| $Li_2CO_3$ product | 0.0466 | 0.0109 | 0.0071 | 0.0433 | 0.0368 | 0.0065 | 0.0629 | 0.0030 | 0.0015 |

| | Cr % | Fe % | Mn % | Co % | Ni % | Cu % | Zn % | $Li_2CO_3$ % |
|---|---|---|---|---|---|---|---|---|
| $Li_2CO_3$ product | 0.0001 | 0.0334 | 0.0005 | 0.0003 | 0.0033 | 0.0006 | 0.0039 | >99.20 |

TABLE 4

ICP Elemental Analysis for Purified Lithium Solution

| | 7 Li ppb | 23 Na ppb | 24 Mg ppb | 27 Al ppb | 31 P ppb | 34 S ppb | 35 Cl ppb | 39 K ppb | 44 Ca ppb | 47 Ti ppb |
|---|---|---|---|---|---|---|---|---|---|---|
| Initial Li solution | 16,975.0 | 72,129.4 | 4.8 | 4,607.5 | 4,365.0 | 275.9 | 529.4 | 42.6 | 173.7 | 15.2 |
| Purified Li solution | 24,322.3 | 99,649.1 | 7.0 | 0 | 1.7 | 327.5 | 603.8 | 546.7 | 26.4 | 5.8 |

| | | 51 V ppb | 52 Cr ppb | 54 F ppb | 55 Mn ppb | 59 Co ppb | 60 Ni ppb | 65 Cu ppb | 66 Zn ppb |
|---|---|---|---|---|---|---|---|---|---|
| | Initial Li solution | 23.5 | 0.3 | 5,952.7 | 6.7 | 0.6 | 2.7 | 3.0 | 1.6 |
| | Purified Li solution | 3.9 | 0.1 | 0 | 0.1 | 0.1 | 0.1 | 0.4 | 0.9 |

TABLE 5

| | ICP Elemental Analysis of Lithium Carbonate Product | | | | | | | | |
|---|---|---|---|---|---|---|---|---|---|
| | Na % | Mg % | Al % | Si % | P % | K % | Ca % | Ti % | V % |
| $Li_2CO_3$ product | 0.0117 | 0.0006 | 0.0003 | 0.0433 | 0.0020 | 0.0004 | 0.0032 | 0.0000 | 0.0000 |
| | Cr % | Fe % | Mn % | Co % | Ni % | Cu % | Zn % | $Li_2CO_3$ % | |
| $Li_2CO_3$ product | 0.0000 | 0.0008 | 0.0000 | 0.0000 | 0.0000 | 0.0001 | 0.0002 | >99.50 | |

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A method comprising:
    suspending a lithium source in a solvent containing an oxidation reagent to extract lithium, forming an extracted lithium solution;
    separating the extracted lithium solution from residual solids of the lithium source;
    purifying the extracted lithium solution by precipitating and filtering impurities;
    precipitating the lithium in the purified lithium solution to generate $Li_2CO_3$, the $Li_2CO_3$ generated via addition of at least one of $Na_2CO_3$ or $K_2CO_3$ to the purified lithium solution;
    extracting lithium from lithium-containing wastewater generated from precipitating the lithium and washing the $Li_2CO_3$, the extracting comprising:
        adding a reagent to the lithium-containing wastewater to precipitate $Li_3PO_4$;
        filtering the lithium-containing wastewater to remove precipitated $Li_3PO_4$;
        adding the $Li_3PO_4$ into a $CaCl_2$ solution; and
        filtering the $CaCl_2$ solution to generate a LiCl solution.

2. The method of claim 1, further comprising:
    preprocessing the lithium source to improve kinetics of the lithium extraction.

3. The method of claim 2, wherein the preprocessing includes a cutting or shredding step to downsize the lithium source.

4. The method of claim 1, wherein the lithium source includes lithium-ion battery waste.

5. The method of claim 1, wherein the oxidation reagent includes at least one of $Na_2S_2O_8$, $K_2S_2O_8$, $(NH_4)_2S_2O_8$, $H_2O_2$, $O_3$, or $N_2O$.

6. The method of claim 1, wherein purifying the extracted lithium comprises:
    adding $CaCl_2$ and $H_2O_2$ into the extracted lithium solution;
    adjusting the pH of the extracted lithium solution between about 10 and about 12; and
    filtering the extracted lithium solution to remove precipitated impurities.

7. The method of claim 6, wherein the adjustment of pH to between about 10 and about 12 is via addition of at least one of NaOH or KOH.

8. The method of claim 6, wherein purifying the extracted lithium solution further comprises:
    adjusting the pH of the extracted lithium solution to between about 5 and about 9; and
    filtering the extracted lithium solution to remove precipitated impurities.

9. The method of claim 8, wherein purifying the extracted lithium solution further comprises:
    adding $Na_2CO_3$, $K_2CO_3$, sodium oxalate, potassium oxalate, oxalic acid, or a combination thereof to the extracted lithium solution;
    adjusting the pH of the extracted lithium solution to between about 8 and about 11; and
    filtering the extracted lithium solution to remove precipitated impurities.

10. The method of claim 9, purifying the extracted lithium further comprises:
    evaporating at least a portion of water present in the extracted lithium solution.

11. The method of claim 9, further comprising:
    running the extracted lithium solution through an ion exchange resin.

12. The method of claim 11, wherein the ion exchange resin contains iminodiacetic functional groups, aminophosphonic functional groups, phosphonic and/or sulphonic acid functional groups, or amino methyl phosphonic acid functional groups.

13. The method of claim 1, wherein generating the $Li_2CO_3$ is via application of carbon dioxide to the purified lithium solution.

14. The method of claim 1, further comprising:
    washing the $Li_2CO_3$ in water.

15. The method of claim 1, wherein the reagent includes at least one of $Na_3PO_4$ or $K_3PO_4$.

16. The method of claim 15, further comprising:
    washing the $Li_2CO_3$ in water to improve the purity of the $Li_3PO_4$.

17. The method of claim 1, further comprising:
    adding at least one of $Na_2CO_3$, $K_2CO_3$, NaOH, or KOH to the LiCl solution; and
    filtering the LiCl solution to increase the concentration of the LiCl solution.

18. The method of claim 1, further comprising:
    precipitating lithium in the LiCl solution to generate additional $Li_2CO_3$.

19. The method of claim 18, wherein precipitating lithium in the LiCl solution to generate additional $Li_2CO_3$ is via the addition of at least one of $Na_2CO_3$ or $K_2CO_3$ to the LiCl solution.

20. The method of claim 18, wherein precipitating lithium in the LiCl solution to generate additional $Li_2CO_3$ is via the addition of carbon dioxide to the LiCl solution.

21. The method of claim 18, further comprising:
    washing the additional $Li_2CO_3$ in water to further purify the additional $Li_2CO_3$.

22. The method of claim 21, further comprising:
    extracting additional lithium from wastewater produced from washing the additional $Li_2CO_3$.

23. The method of claim 1, further comprising:
feeding the LiCl solution to the extracted lithium solution to generate more $Li_2CO_3$.

24. The method of claim 23, further comprising:
combining the LiCl solution with an additional lithium source.

* * * * *